(12) United States Patent
Balutkar et al.

(10) Patent No.: US 12,095,296 B1
(45) Date of Patent: Sep. 17, 2024

(54) CHARGER DOCKING ADAPTER SYSTEM FOR PORTABLE ELECTRONIC DEVICES

(71) Applicant: Pioneer Square Brands, Inc., Seattle, WA (US)

(72) Inventors: Vrushank Deepak Balutkar, Jamestown, NC (US); Mark Elliott Jones, Greensboro, NC (US)

(73) Assignee: Pioneer Square Brands, Inc., Seattle, WA (US)

( * ) Notice: Subject to any disclaimer, the term of this patent is extended or adjusted under 35 U.S.C. 154(b) by 0 days.

(21) Appl. No.: 18/423,167

(22) Filed: Jan. 25, 2024

Related U.S. Application Data

(63) Continuation-in-part of application No. 18/506,991, filed on Nov. 10, 2023, now Pat. No. 11,962,177.

(51) Int. Cl.
*H02J 7/00* (2006.01)
*G06F 1/16* (2006.01)

(52) U.S. Cl.
CPC .......... *H02J 7/0044* (2013.01); *G06F 1/1632* (2013.01)

(58) Field of Classification Search
CPC ..... G06F 1/1613; G06F 1/1632; H01R 33/74; H01R 33/76; H01R 13/516; H01R 13/518; H02J 7/0042; H02J 7/0044; H02J 7/0045
USPC ...................................... 439/38–40
See application file for complete search history.

(56) References Cited

U.S. PATENT DOCUMENTS

| | | | |
|---|---|---|---|
| 6,014,011 A * | 1/2000 | DeFelice | H02J 7/0036 320/114 |
| D506,972 S * | 7/2005 | Parel | D13/107 |
| 7,541,774 B2 * | 6/2009 | Zedell | H02J 7/0045 320/112 |
| 8,575,887 B1 * | 11/2013 | Pomare | H02J 7/0044 320/101 |
| 11,769,976 B1 | 9/2023 | Lakic et al. | |
| D1,008,171 S * | 12/2023 | Haskins | D13/107 |
| 11,855,397 B1 * | 12/2023 | Lynch | H01R 12/91 |
| 2009/0284216 A1 * | 11/2009 | Bessa | H02J 7/0044 320/101 |
| 2015/0288215 A1 * | 10/2015 | Zhang | G06F 1/1632 320/108 |
| 2021/0045510 A1 * | 2/2021 | Okada | B65D 81/22 |
| 2021/0242695 A1 * | 8/2021 | Zadehsoltan | H02J 50/80 |

* cited by examiner

*Primary Examiner* — Khiem M Nguyen
(74) *Attorney, Agent, or Firm* — Grandview Law

(57) ABSTRACT

A docking adapter for coupling with a charger assembly includes a receptacle, a front wall, a first side extension, and a second side extension. The receptacle includes an interior area and is positioned within a mid-portion of the docking adapter. The front wall bounds in part a portion of the mid-portion of the docking adapter. The first side extension extends in part away from a portion the mid-portion of the docking adapter in a first direction. The second side extension extends in part away from a portion the mid-portion of the docking adapter in a second direction, opposite the first direction.

17 Claims, 50 Drawing Sheets

CHARGER DOCKING ADAPTER SYSTEM FOR PORTABLE ELECTRONIC DEVICES

SUMMARY

In one or more aspects a charger docking adapter system for a portable electronic device includes (I) a charger assembly including (A) an interior area; and (II) a docking adapter coupled with the charger assembly, the docking adapter including a receptacle for the portable electronic device, the receptacle including an interior area, wherein at least a portion of the interior area of the receptacle is positioned inside the interior area of the charger assembly when the docking adapter is coupled with the charger assembly. Wherein the charger assembly further includes (B) a base bounding in part the interior area, (C) a first side interior facing the interior area, the first side interior bounding in part the interior area, (D) a second side interior facing the interior area, the second side interior bounding in part the interior area, a first portion of the first side interior facing the second side interior, the first portion of the first side interior spaced from the second side interior a first distance, and (E) a third side interior facing the interior area, the third side interior bounding in part the interior area, a second portion of the first side interior facing the third side interior, the second portion of the first side interior spaced from the third side interior a second distance, wherein the first distance is greater than the second distance. Wherein the docking adapter includes a front wall portion spaced from and extending along at least an exterior portion of the receptacle, and wherein at least a portion of the front wall portion is in contact with at least a portion of the second side interior of the charger assembly. Wherein the charger assembly includes a fourth side interior facing the interior area, the fourth side interior bounding in part the interior area, and wherein the fourth side interior extends between the second side interior and the third side interior. Wherein the charger assembly being without a side interior extending between the second side interior and the first side interior, wherein the charger assembly is without a side interior extending between the third side interior and the first side interior, and wherein the docking adapter includes a side extension coupled with the second portion of the first side interior of the charger assembly and coupled to the third side interior of the charger assembly, the side extension extending between the second portion of the first side interior and the third side interior. Wherein the charger assembly includes an electrical interface, and wherein the receptacle of the docking adapter includes a bottom aperture to provide access to the electrical interface when the docking adapter is coupled to the charger assembly. Wherein the charger assembly includes a first cushion pad and a second cushion pad, wherein the second portion of the first side interior of the charger assembly is coupled with the first cushion pad, wherein the third side interior of the charger assembly is coupled with the second cushion pad, wherein the second cushion pad of the third side interior faces the first cushion pad of the second portion of the first side interior, wherein the docking adapter is coupled with the first cushion pad of the charger assembly, and wherein the docking adapter is coupled with the second cushion pad of the charger assembly. Wherein the docking adapter includes a first barb and a second barb, wherein the first barb of the docking adapter is coupled with the first cushion pad of the charger assembly, and wherein the second barb of the docking adapter is coupled with the second cushion pad of the charger assembly. Wherein the second portion of the first side interior of the charger assembly includes a first beveled edge, wherein the docking adapter includes a first beveled edge being in contact with at least a portion of the first beveled edge of the second portion of the first side interior of the charger assembly, wherein the third side interior of the charger assembly includes a second beveled edge, and wherein the docking adapter includes a second beveled edge being in contact with at least a portion of the second beveled edge of the third side interior of the charger assembly.

In one or more aspects a charger docking adapter system for a portable electronic device includes (I) a charger assembly including (A) an interior area including a first border, a second border opposite a mid-portion of the first border, a third border opposite a first end portion of the first border, a fourth border opposite a second end portion of the first border, a fifth border extending perpendicular with respect to the second border and the third border between the second border and the third border, a sixth border extending perpendicular with respect to the second border and the fourth border between the second border and the fourth border, a seventh border extending between the third border and the first end portion of the first border, an eighth border extending between the fourth border and the second end portion of the first border, (B) a first side interior bounding the first border of the interior area, (C) a second side interior bounding the second border of the interior area, (D) a third side interior bounding the third border of the interior area, (E) a fourth side interior bounding the fourth border of the interior area, (F) a fifth side interior bounding the fifth border of the interior area, (G) a sixth side interior bounding the sixth border of the interior area, wherein the seventh border of the interior area is unbonded by any side interior of the charger assembly, and wherein the eighth border of the interior area is unbonded by any side interior of the charger assembly; and (II) a docking adapter coupled with the charger assembly, the docking adapter including (A) a receptacle for the portable electronic device, the receptacle including an interior area, wherein at least a portion of the interior area of the receptacle is positioned inside the interior area of the charger assembly when the docking adapter is coupled with the charger assembly. Wherein the docking adapter includes a front wall portion spaced from and extending along at least an exterior portion of the receptacle, and wherein at least a portion of the front wall portion is in contact with at least a portion of the second side interior of the charger assembly. Wherein the charger assembly includes an electrical interface, and wherein the receptacle of the docking adapter includes a bottom aperture to provide access to the electrical interface when the docking adapter is coupled to the charger assembly. Wherein the charger assembly includes a first cushion pad and a second cushion pad facing the first cushion pad, wherein the first end portion of the first side interior of the charger assembly is coupled with the first cushion pad, wherein the third side interior of the charger assembly is coupled with the second cushion pad, wherein the docking adapter is coupled with the first cushion pad of the charger assembly, and wherein the docking adapter is coupled with the second cushion pad of the charger assembly. Wherein the docking adapter includes a first barb and a second barb, wherein the first barb of the docking adapter is coupled with the first cushion pad of the charger assembly, and wherein the second barb of the docking adapter is coupled with the second cushion pad of the charger assembly. Wherein the first side interior of the charger assembly includes a first beveled edge, wherein the docking adapter includes a first beveled edge being in contact with at least a portion of the first beveled edge of the first side interior of the charger assembly, wherein the third side interior of the charger assembly includes a second beveled edge, and wherein the docking adapter includes a second beveled edge being in contact with at least a portion of the second beveled edge of the third side interior of the charger assembly.

In one or more aspects a charger docking adapter system for a portable electronic device includes (I) a charger assembly with an interior area, the charger assembly including (A) a first side bounding in part the interior area, (B) a second side bounding in part the interior area having a first end and a second end, the second side being positioned opposite of the first side, (C) a third side bounding in part the interior area, the third side perpendicularly extending between the first end of the second side and an end of the third side, (D) a fourth side bounding in part the interior area, the fourth side perpendicularly extending between the second end of the second side and an end of the fourth side, (E) a first channel into the interior area including a width extending between the first side and the end of the third side, and (F) a second channel into the interior area including a width extending between the first side and the end of the fourth side; and (II) a docking adapter coupled with the charger assembly, the docking adapter including (A) a receptacle with an interior area, wherein at least a portion of the receptacle is positioned inside the interior area of the charger assembly when the docking adapter is coupled with the charger assembly. Wherein the charger assembly includes a first cushion pad and a second cushion pad facing the first cushion pad, wherein the first side interior of the charger assembly is coupled with the first cushion pad, wherein the third side interior of the charger assembly is coupled with the second cushion pad, wherein the docking adapter includes a first barb coupled with the first cushion pad of the charger assembly, and wherein the docking adapter includes a second barb coupled with the second cushion pad of the charger assembly. Wherein the first side interior of the charger assembly includes a first beveled edge, wherein the docking adapter includes a first beveled edge being in contact with at least a portion of the first beveled edge of the first side interior of the charger assembly, wherein the third side interior of the charger assembly includes a second beveled edge, and wherein the docking adapter includes a second beveled edge being in contact with at least a portion of the second beveled edge of the third side interior of the charger assembly.

In one or more aspects a docking adapter for a portable electronic device and for coupling with a charger assembly includes (I) a receptacle including an interior area, the receptacle positioned within a mid-portion of the docking adapter; (II) a front wall bounding in part a portion of the mid-portion of the docking adapter; (III) a first side extension extending in part away from a portion the mid-portion of the docking adapter in a first direction; and (IV) a second side extension extending in part away from a portion the mid-portion of the docking adapter in a second direction, opposite the first direction. Wherein the docking adapter includes at least one barb.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Charger Docking Adapter System for Portable Electronic Devices, articles of manufacture, compositions of matter for same that may provide context, for instance, in introducing one or more processes and/or devices described herein.

DETAILED DESCRIPTION

Figure 1:
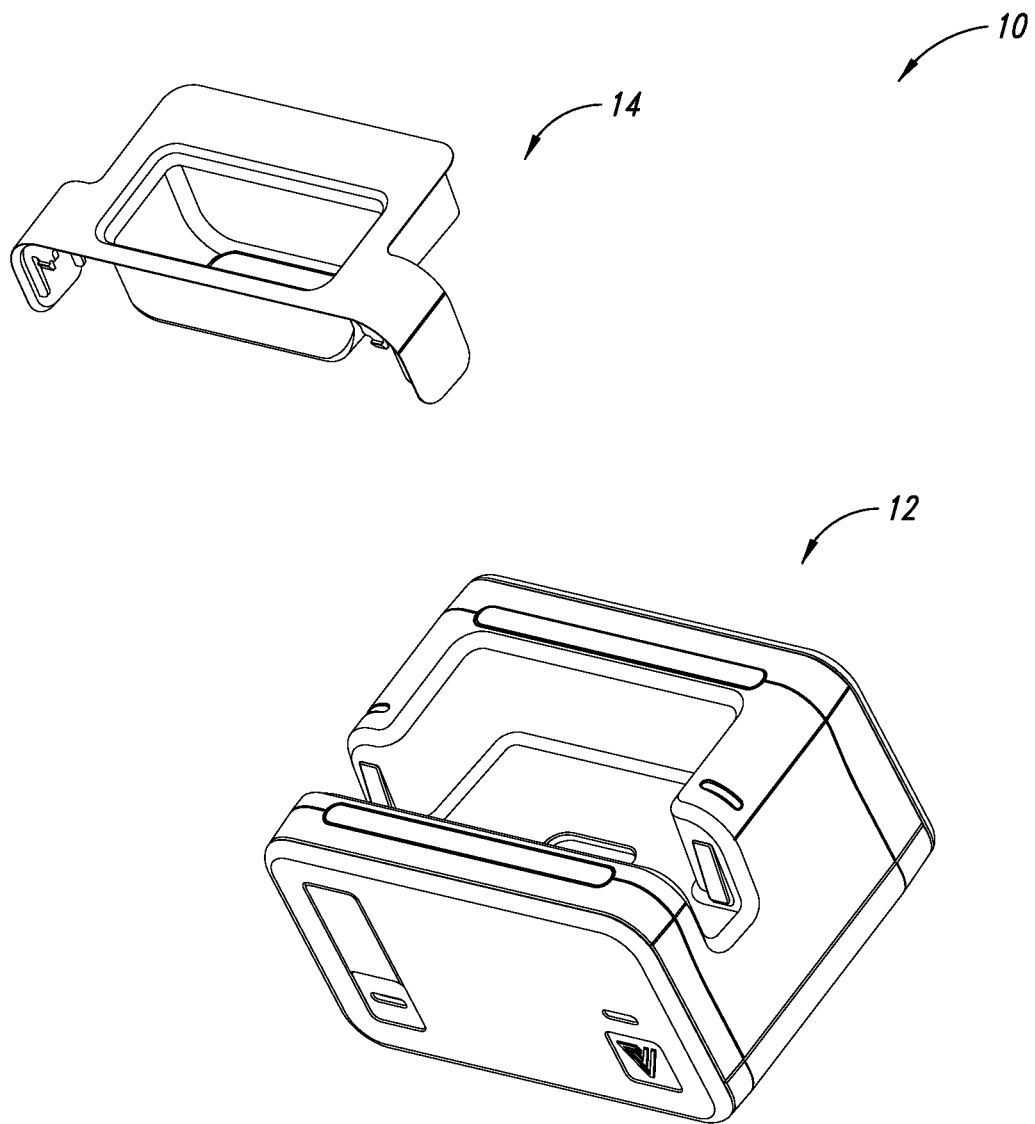
FIG. 1 is a top front perspective view of a charger docking adapter system for portable electronic devices.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top front perspective view of charger docketing adapter system 10 for a portable electronic device. Depicted implementation of charger docketing adapter system 10 is shown to include charger assembly 12, and docking adapter 14.

Figure 2:
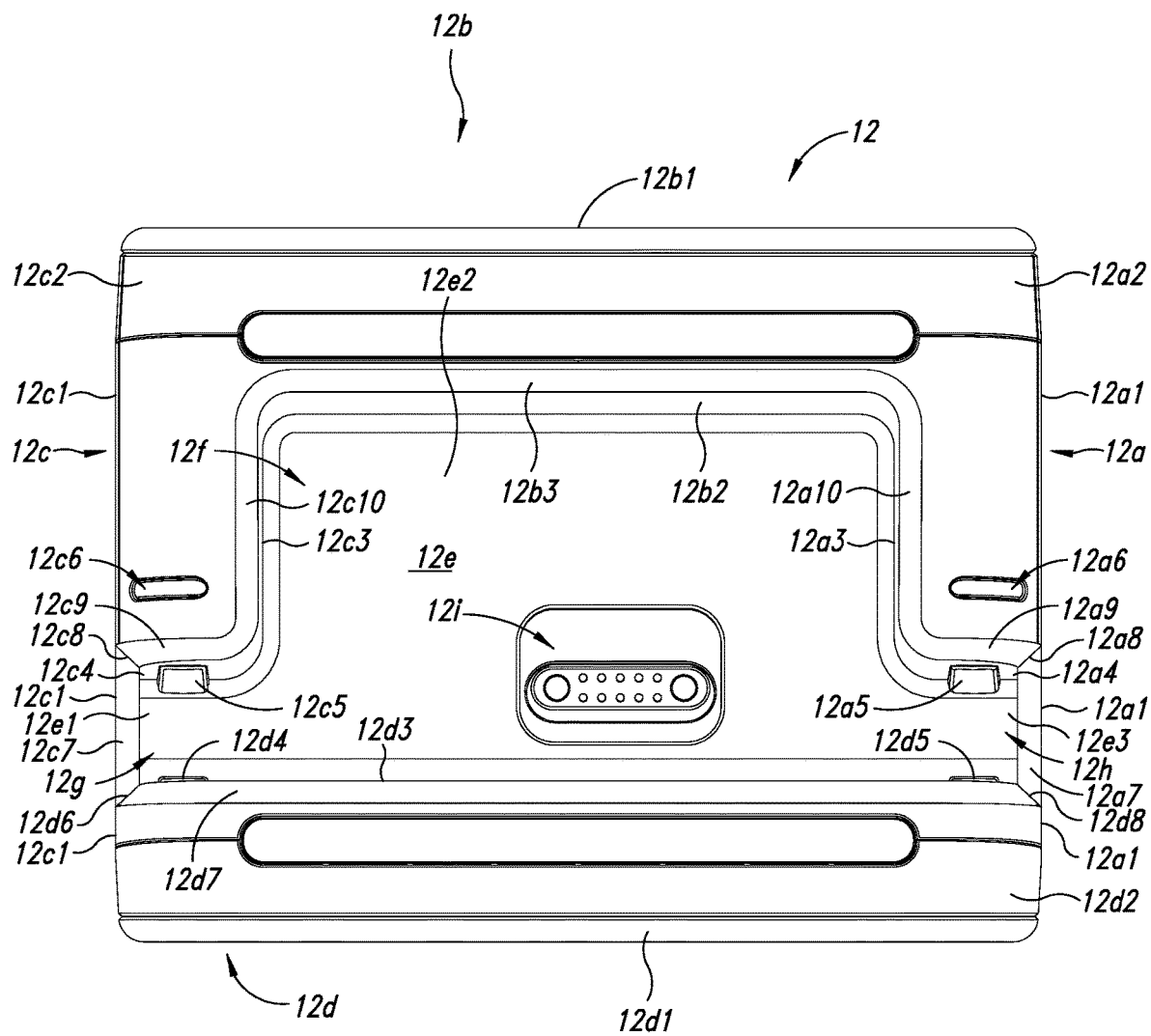
FIG. 2 is a top plan view of a charger assembly of FIG. 1.

Turning to FIG. 2, depicted therein is a top plan view of charger assembly 12, which is shown to include side 12a, side 12b, side 12c, side 12d, and base 12e shown to in part bound interior area 12f, channel 12g, channel 12h, and electrical interface 12i, which electrically couples with a conventional portable electronic device (not shown) such as but not limited to a phone or a computer.

Depicted implementation of side 12a is shown to include side portion 12a1, upper exterior 12a2, side interior 12a3, and side interior 12a4, cushion pad 12a5, indicator light 12a6, beveled edge 12a7, beveled edge 12a8, beveled edge 12a9, and beveled edge 12a10. As shown, side portion 12a1 has beveled edge 12a7 and side interior 12a3 has beveled edge 12a10. Depicted implementation of side 12b is shown to include side portion 12b1, side interior 12b2, and beveled edge 12b3. As shown, side interior 12b2 has beveled edge 12b3.

Depicted implementation of side 12c is shown to include side portion 12c1, upper exterior 12c2, side interior 12c3, side interior 12c4, cushion pad 12c5, indicator light 12c6, beveled edge 12c7, beveled edge 12c8, beveled edge 12c9, and beveled edge 12c10. As shown, side portion 12c1 has beveled edge 12c7, side interior 12c3 has beveled edge 12c10, and side interior 12c4 has beveled edge 12c8 and beveled edge 12c9.

Depicted implementation of side 12d is shown to include side portion 12d1, upper exterior 12d2, and side interior 12d3, cushion pad 12d4, cushion pad 12d5, beveled edge 12d6, beveled edge 12d7, and beveled edge 12d8. As shown, side interior 12d3 has beveled edge 12d6, beveled edge 12d7, and beveled edge 12d8. Depicted implementation of base 12e is shown to include base portion 12e1, base portion 12e2, and base portion 12e3.

Depicted implementation of interior area 12f is shown to be collectively defined in part by or to have borders that are bounded by side interior 12a3, side interior 12a4, side interior 12b2. Depicted implementation of interior area 12f is also shown to be collectively defined in part by or to have borders that are bounded by side interior 12c3 and side interior 12c4. Furthermore, depicted implementation of interior area 12f is shown to be collectively defined in part by or to have borders that are bounded by base 12e including base portion 12e1, base portion 12e2, and base portion 12e3. interior area 12f is also shown to have unbounded borders related to channel 12g and channel 12h.

Depicted implementation of channel 12g is shown to be collectively defined at least in part by side interior 12c4, side interior 12d3, and base portion 12e1. Depicted implementation of channel 12h is shown to be collectively defined at least in part by side interior 12a4, side interior 12d3, and base portion 12e3.

Figure 3:
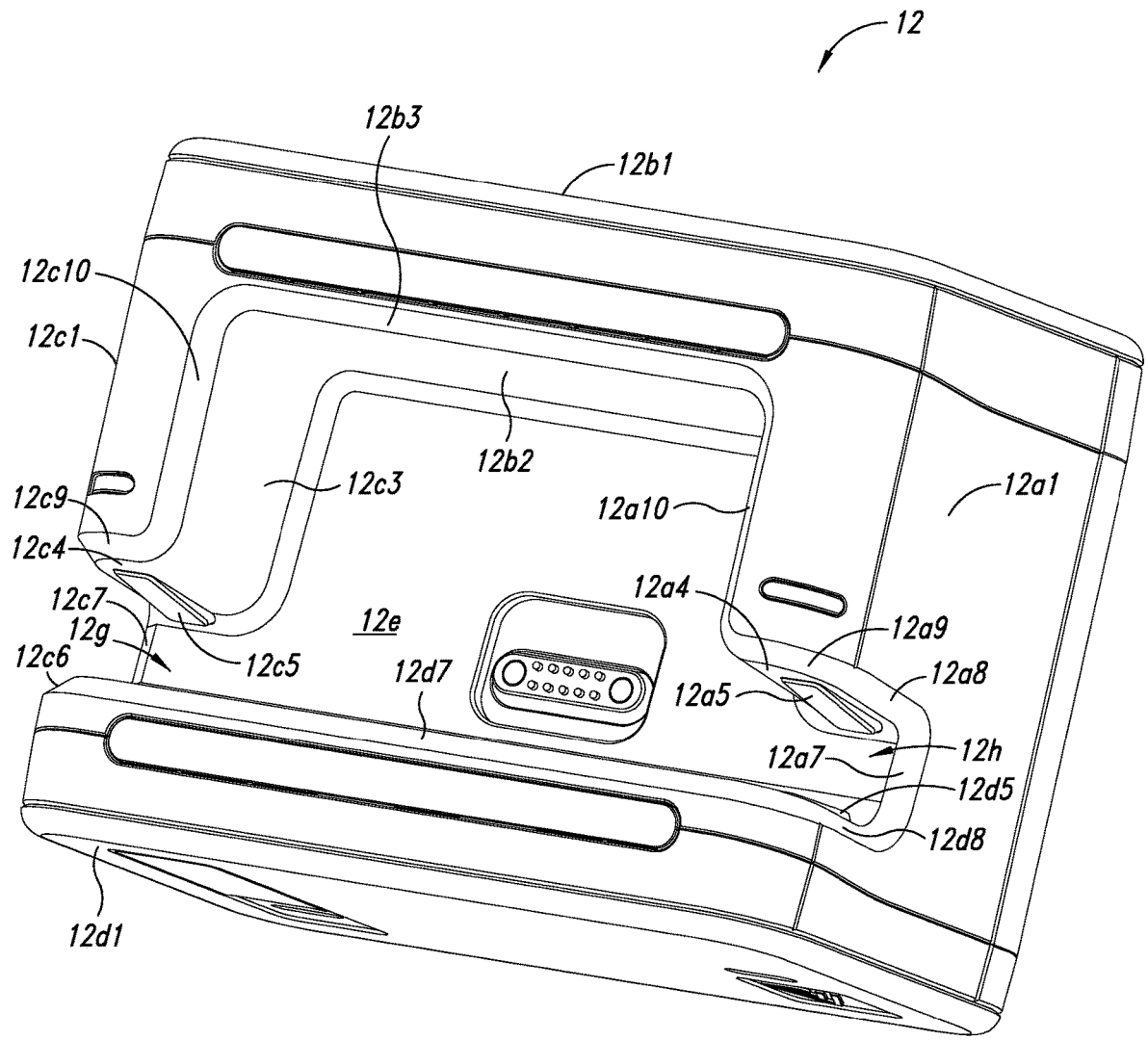
FIG. 3 is a top front perspective view of the charger assembly of FIG. 1.

Turning to FIG. 3, depicted therein is a top front perspective view of charger assembly 12.

Figure 4:
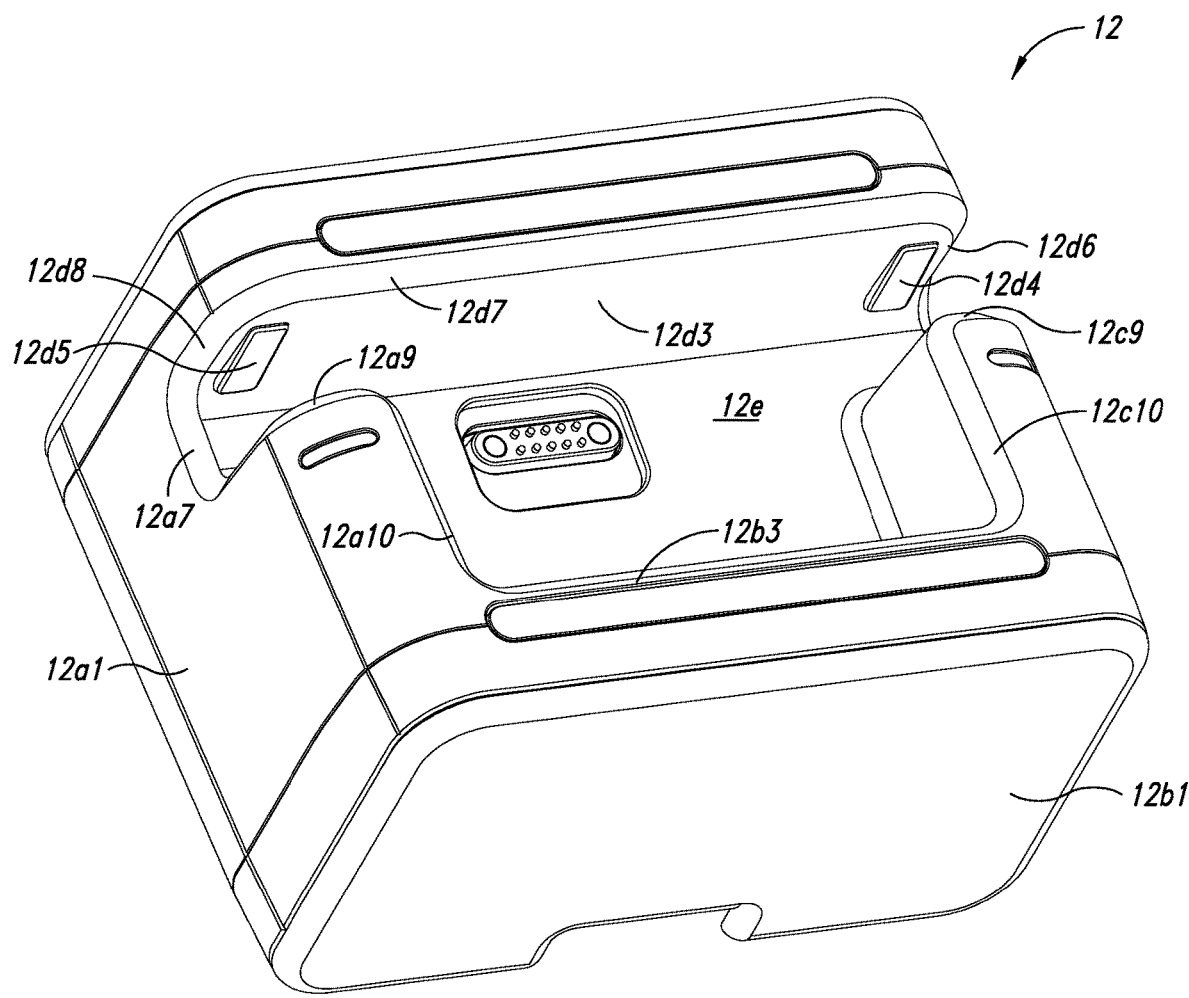
FIG. 4 is a top rear perspective view of the charger assembly of FIG. 1.

Turning to FIG. 4, depicted therein is a top rear perspective view of charger assembly 12.

Figure 5:
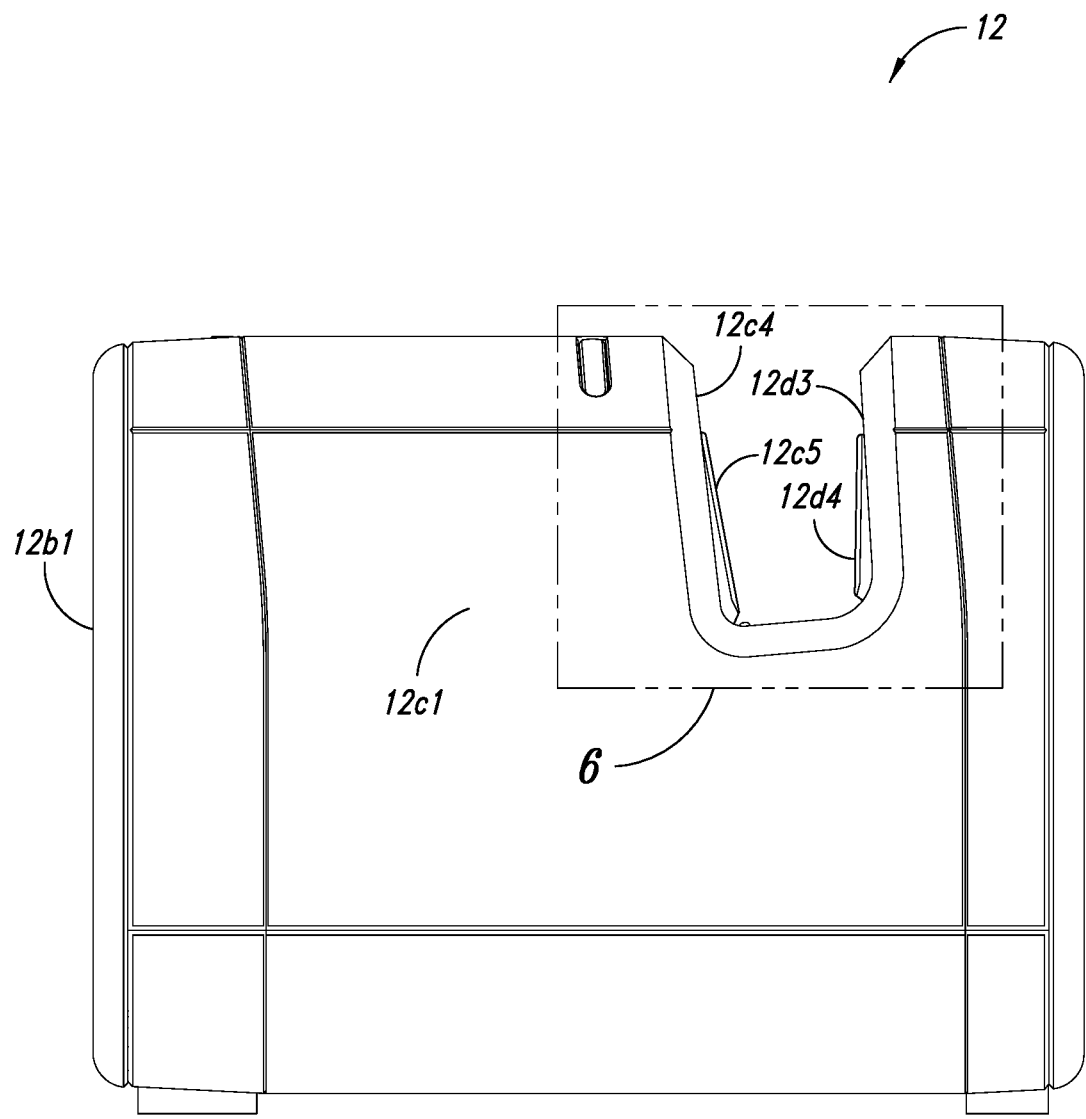
FIG. 5 is a side elevational view of the charger assembly of FIG. 1.

Turning to FIG. 5, depicted therein is a side elevational view of charger assembly 12.

Figure 6:
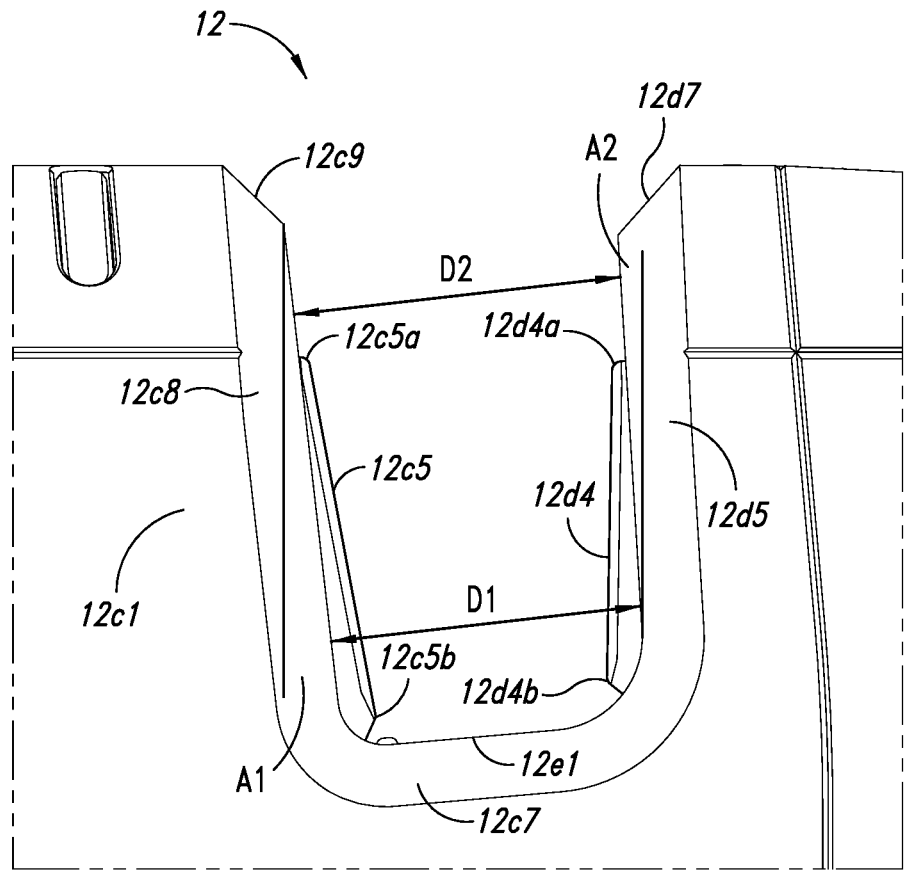
FIG. 6 is an enlarged side elevational partial view of the charger assembly of FIG. 5.

Turning to FIG. 6, depicted therein is an enlarged side elevational view of charger assembly 12. Depicted implementation of cushion pad 12d4 is shown to include top 12d4a and bottom 12d4b. Depicted implementation of cushion pad 12c5 is shown to include top 12c5a and bottom 12c5b. Depicted implementation of charger assembly 12 is shown to include angle A1, angle A2, dimension D2, and dimension D2.

Figure 7:
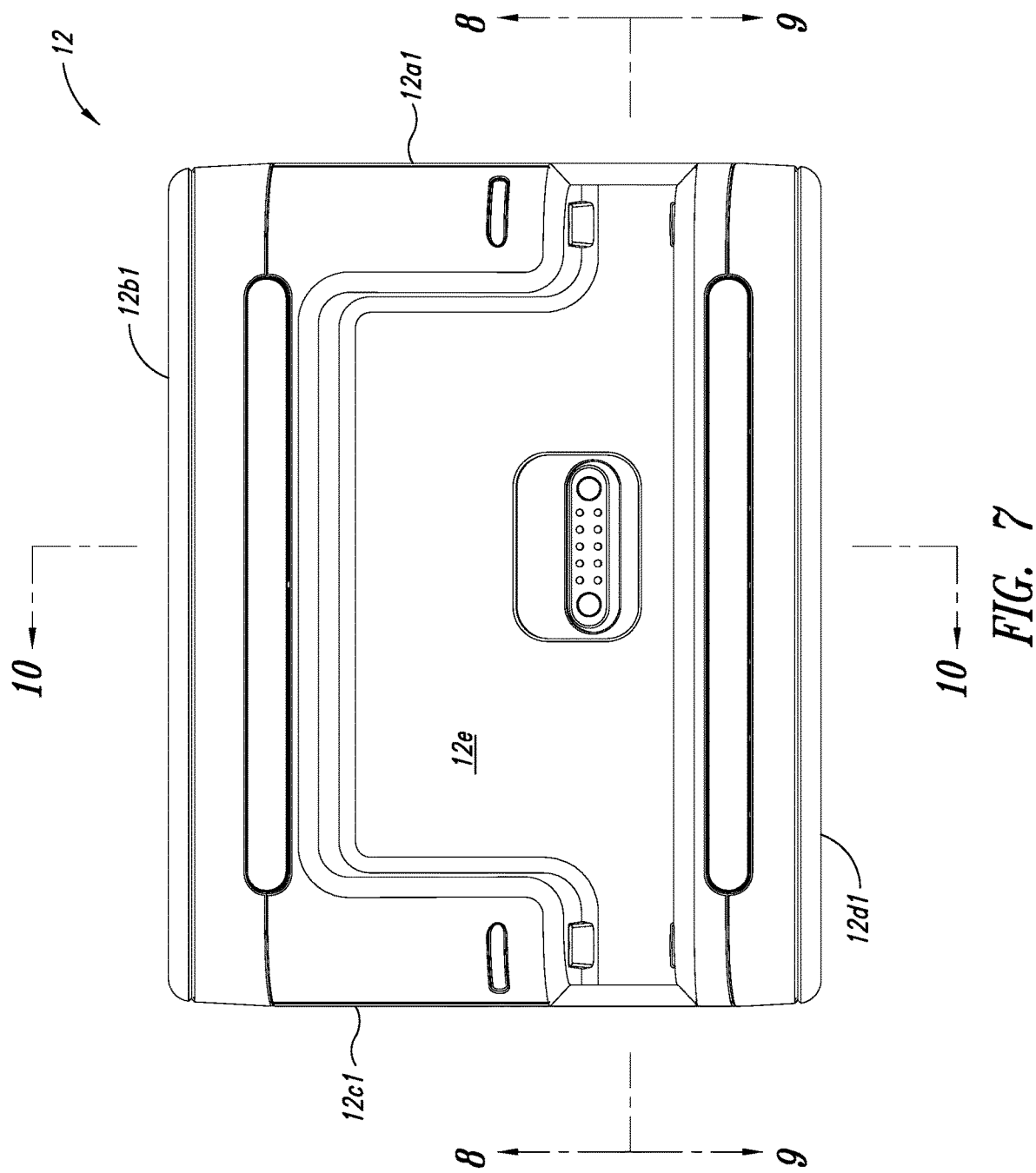
FIG. 7 is a top plan view of the charger assembly of FIG. 1.

Turning to FIG. 7, depicted therein is a top plan view of charger assembly 12.

Figure 8:
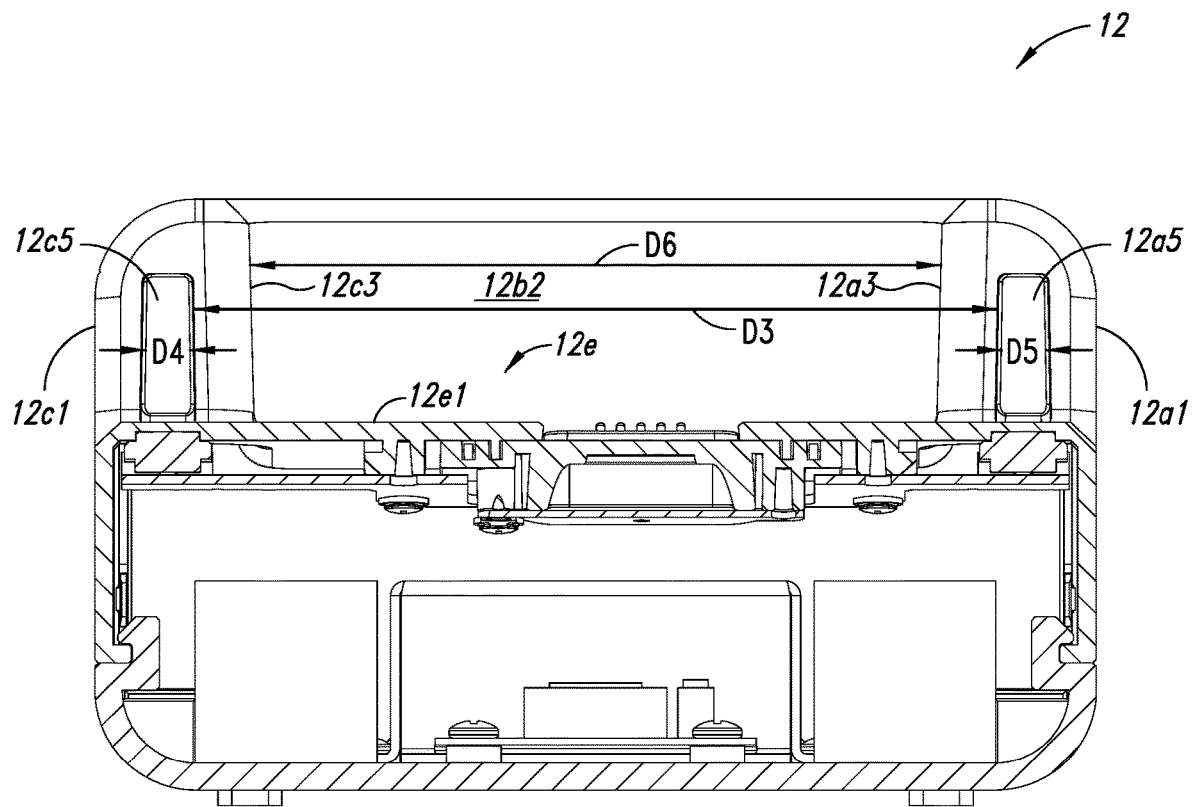
FIG. 8 is a cross sectional side elevational view of the charger assembly taken along the 8-8 cutline of FIG. 7.

Turning to FIG. 8, depicted therein is a cross sectional side elevational view of charger assembly 12 taken along the 8-8 cutline of FIG. 7. Depicted implementation of charger assembly 12 is shown to include dimension D3, dimension D4, dimension D5, and dimension D6.

Figure 9:
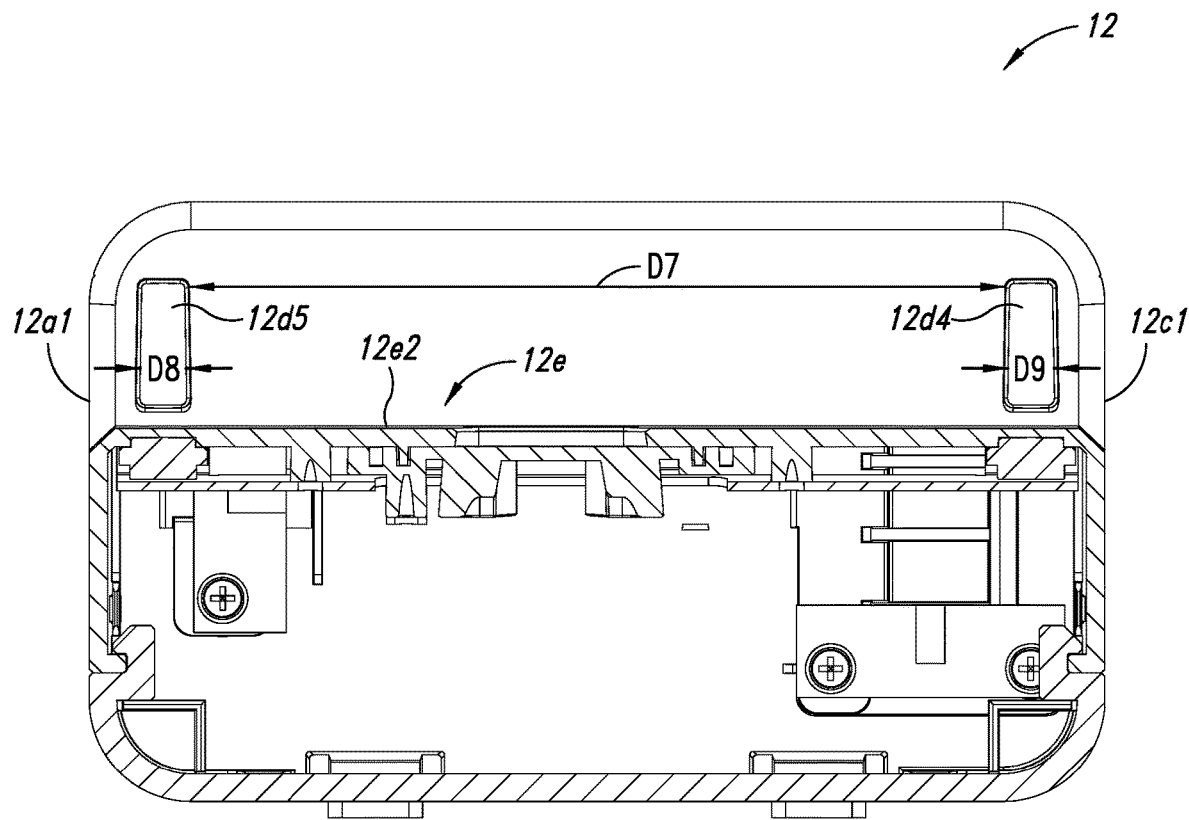
FIG. 9 is a cross sectional side elevational view of the charger assembly taken along the 9-9 cutline of FIG. 7.

Turning to FIG. 9, depicted therein is a cross sectional side elevational view of charger assembly 12 taken along the 9-9 cutline of FIG. 7. Depicted implementation of charger assembly 12 is shown to include dimension D7, dimension D8, and dimension D9.

Figure 10:
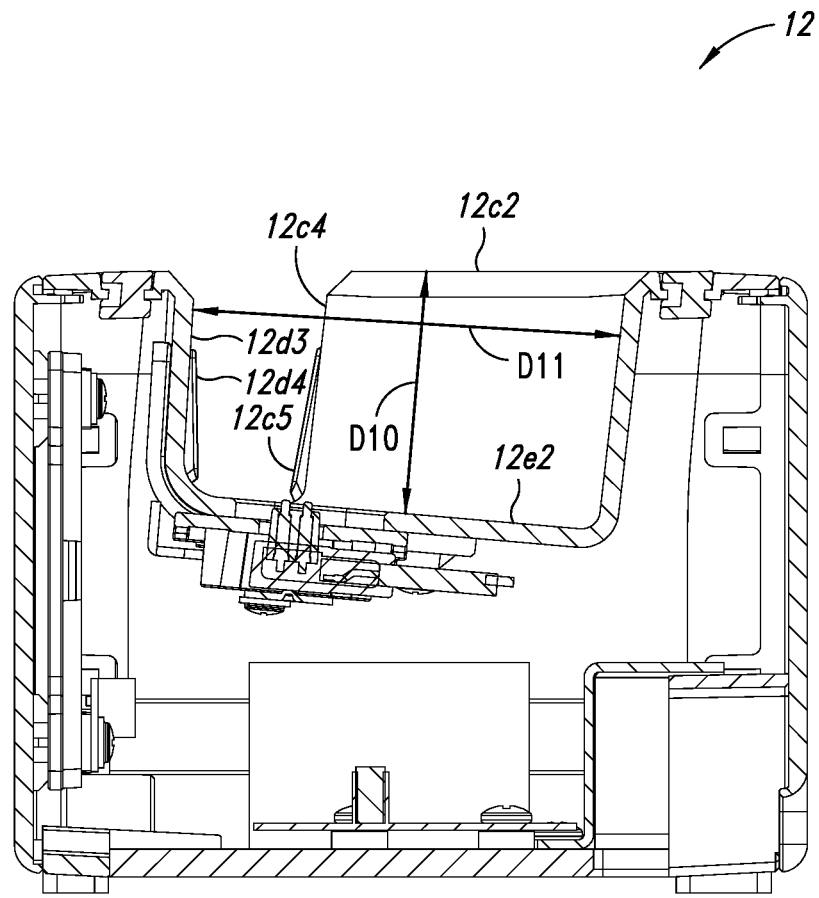
FIG. 10 is a cross sectional side elevational view of the charger assembly taken along the 10-10 cutline of FIG. 7.
Figure 10A:
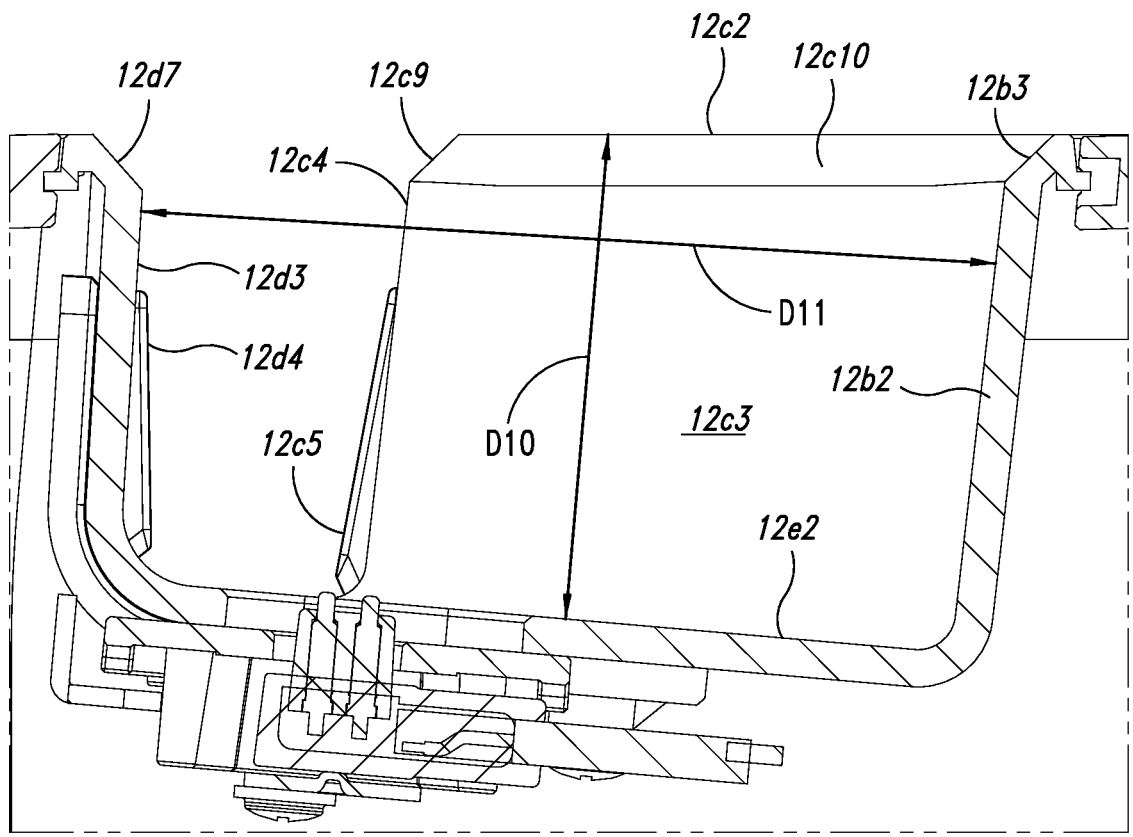
FIG. 10A is an enlarged cross sectional side elevational view of the charger assembly of FIG. 10.

Turning to FIG. 10, depicted therein is a cross sectional side elevational view of charger assembly 12. Depicted implementation of charger assembly 12 is shown to include dimension D10 and dimension D11.

Figure 11:
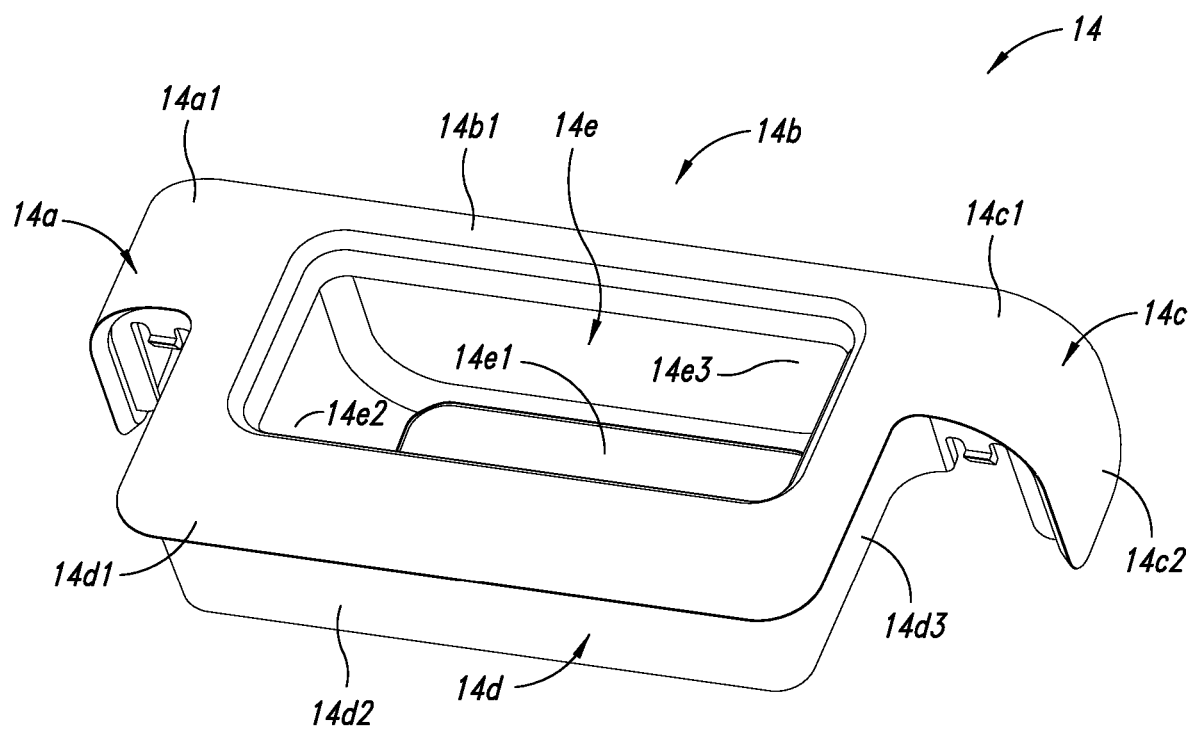
FIG. 11 is a top front perspective view of the docking adapter of FIG. 1.

Turning to FIG. 11, depicted therein is a top front perspective view of docking adapter 14. Depicted implementation of docking adapter 144 is shown to include side extension 14a, rear 14b, side extension 14c, front 14d, and receptacle interior area 14e. Depicted implementation of side extension 14a is shown to include top portion 14a1. Depicted implementation of rear 14b is shown to include top portion 14b1. Depicted implementation of side extension 14c is shown to include top portion 14c1 and side portion 14c2. Depicted implementation of front 14d is shown to include top portion 14d1, front wall portion 14d2, and side wall portion 14d3.

Depicted implementation of receptacle interior area 14e is shown to include bottom aperture 14e1, side portion 14e2, and rear portion 14e3. In implementations, bottom aperture 14e1 provides access to electrical interface 12i (shown in FIG. 2) when docking adapter 14 is coupled with charger assembly 12.

Figure 12:
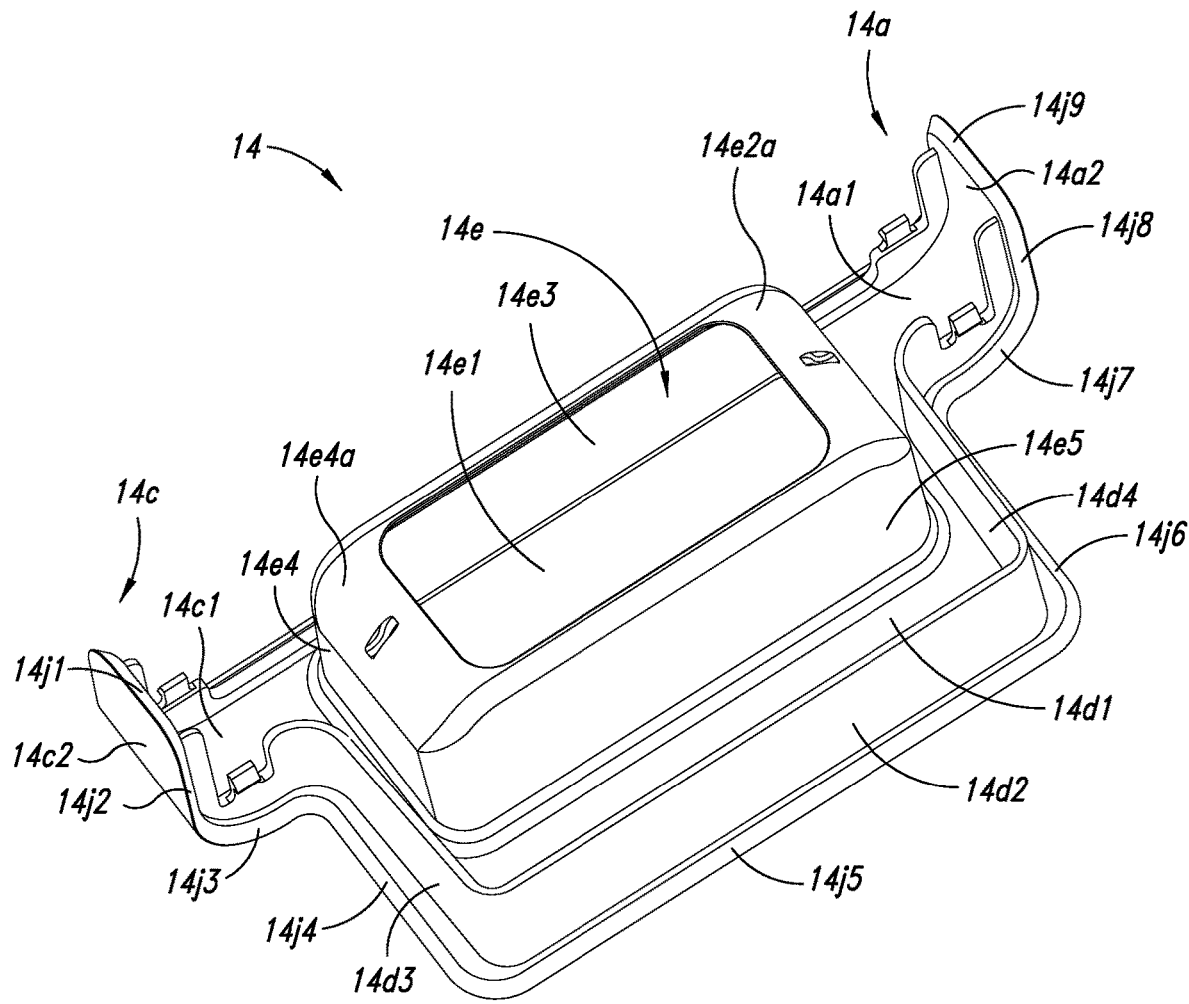
FIG. 12 is a bottom front perspective view of the docking adapter of FIG. 1.

Turning to FIG. 12, depicted therein is a front perspective view of docking adapter 14. Depicted implementation of side extension 14a is shown to include side portion 14a2. Depicted implementation of front 14d is shown to include side wall portion 14d4. Depicted implementation of side portion 14e2 is shown to include bottom portion 14e2a. Depicted implementation of receptacle interior area 14e is shown to include side portion 14e4 and front portion 14e5. Depicted implementation of side portion 14e4 is shown to include bottom portion 14e4a.

As shown in FIGS. 11, 12, and elsewhere, side portion 14e2, rear portion 14e3, side portion 14e4, and front portion 14e5 along with bottom portion 14e2a and bottom portion 14e4a in part bound side portion 14e2 with a receptacle structure to be used to receive a conventional portable electronic device (not shown). Depicted implementation of docking adapter 14 is shown to include beveled edge 14j1 beveled edge 14j2, beveled edge 14j3, beveled edge 14j4, beveled edge 14j5, beveled edge 14j6, beveled edge 14j7, beveled edge 14j8, and beveled edge 14j9.

Figure 13:
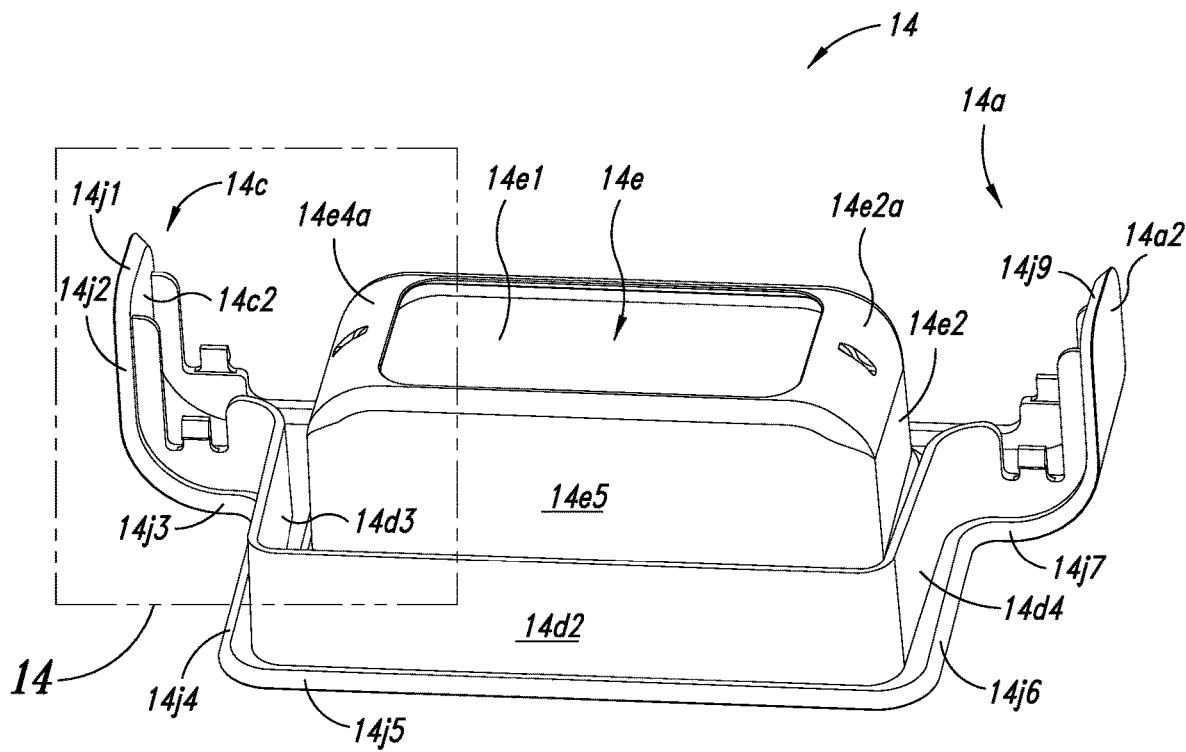
FIG. 13 is a bottom rear perspective view of the docking adapter of FIG. 1.

Turning to FIG. 13, depicted therein is a bottom front perspective view of docking adapter 14.

Figure 14:
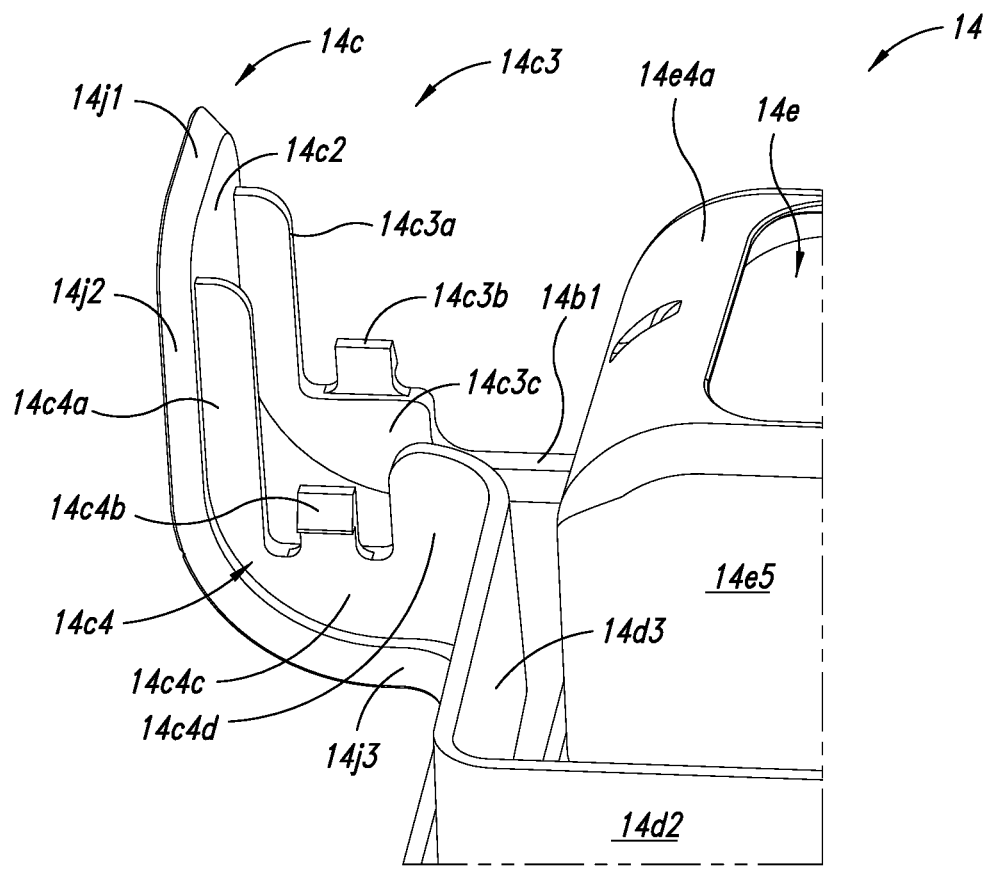
FIG. 14 is an enlarged bottom rear perspective partial view of the docking adapter of FIG. 13.

Turning to FIG. 14, depicted therein is a bottom rear perspective view of docking adapter 14. Depicted implementation of side extension 14c is shown to include coupler portion 14c3 and coupler portion 14c4. Depicted implementation of coupler portion 14c3 is shown to include support 14c3a, barb 14c3b, and support 14c3c. Depicted implementation of coupler portion 14c4 is shown to include support 14c4a, barb 14c4b, support 14c4c, and curved side 14c4d.

Figure 15:
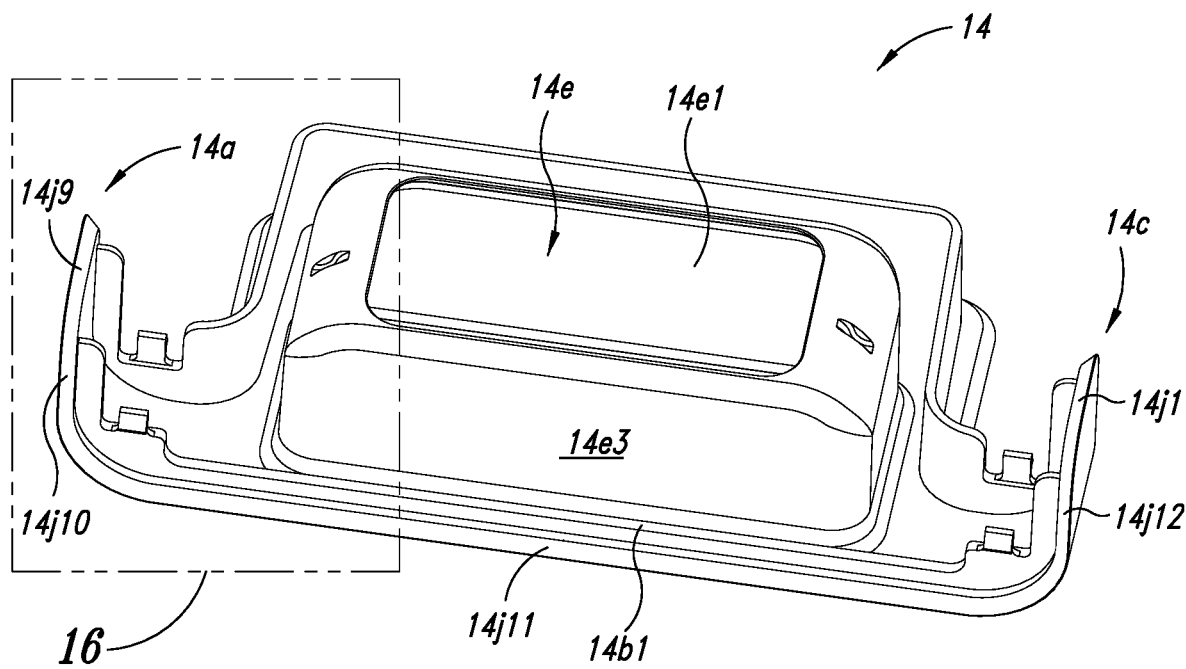
FIG. 15 is a bottom rear perspective view of the docking adapter of FIG. 1.

Turning to FIG. 15, depicted therein is a bottom rear perspective view of docking adapter 14. Depicted implementation of docking adapter 14 is shown to include beveled edge 14j10, beveled edge 14j11, and beveled edge 14j12.

Figure 16:
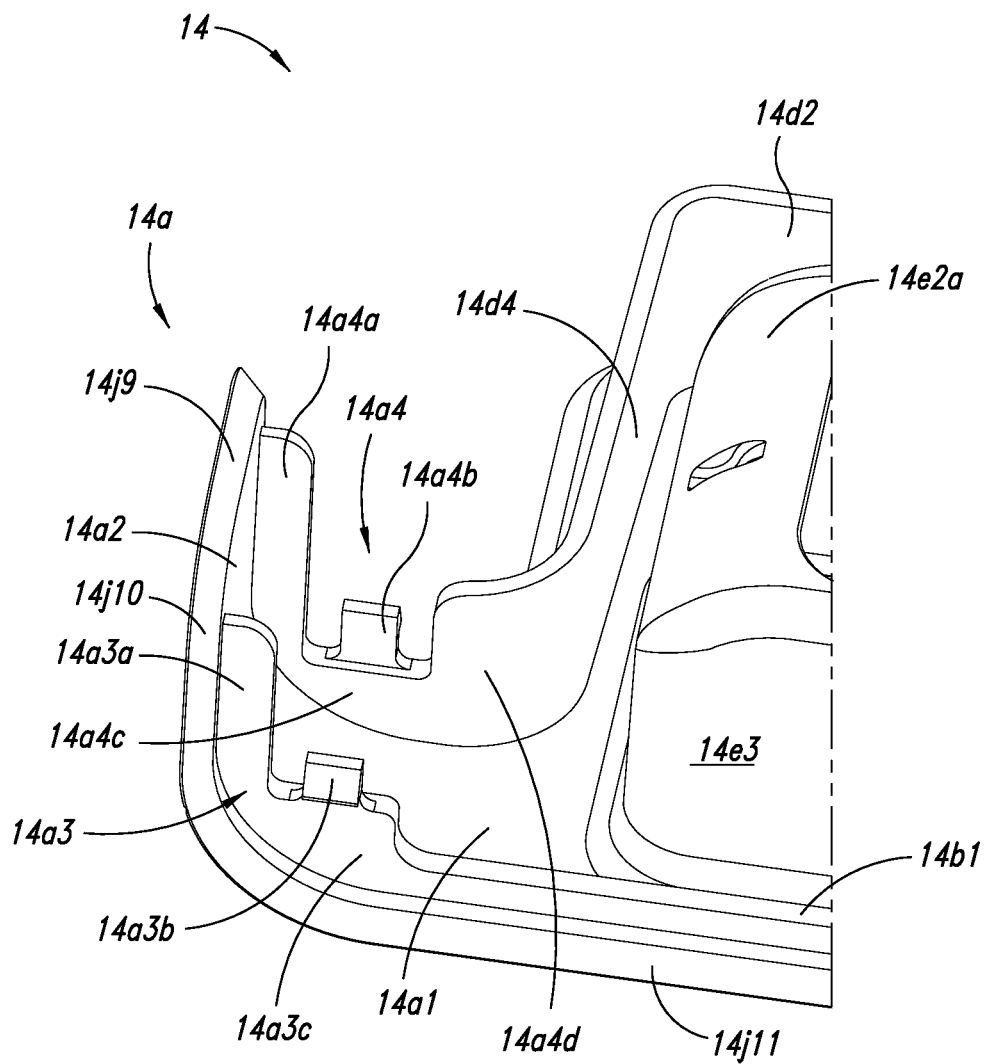
FIG. 16 is an enlarged bottom rear perspective partial view of the docking adapter of FIG. 15.

Turning to FIG. 16, depicted therein is an enlarged bottom rear perspective view of docking adapter 14 shown to include side extension 14a. Depicted implementation of side extension 14a is shown to include coupler portion 14a3 and coupler portion 14a4. Depicted implementation of coupler portion 14a3 is shown to include support 14a3a, barb 14a3b, and support 14a3c. Depicted implementation of coupler portion 14a4 is shown to include support 14a4a, barb 14a4b, support 14a4c, and curved side 14a4d.

Figure 17:
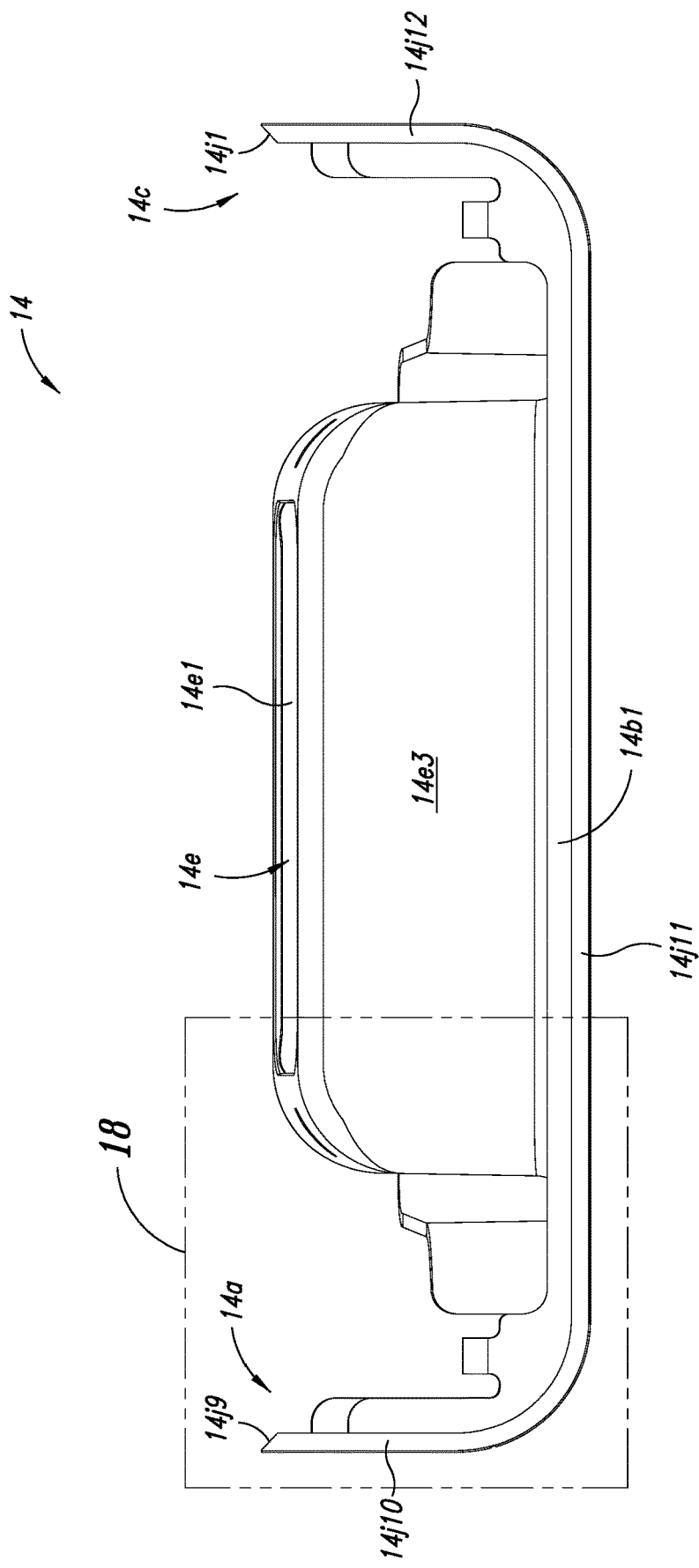
FIG. 17 is a side elevational rear view of the docking adapter of FIG. 1.

Turning to FIG. 17, depicted therein is a side elevational rear view of docking adapter 14.

Figure 18:
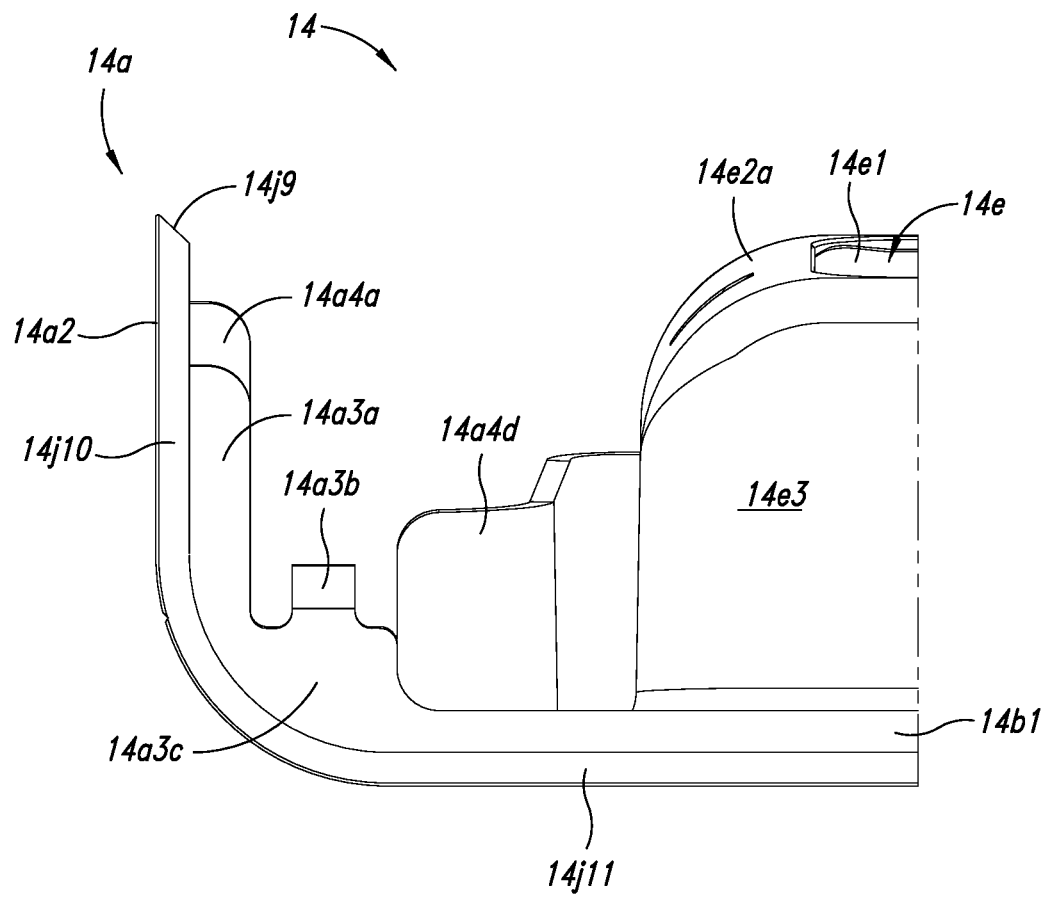
FIG. 18 is an enlarged side elevational rear partial view of the docking adapter of FIG. 17.

Turning to FIG. 18, depicted therein is an enlarged side elevational rear view of docking adapter 14.

Figure 19:
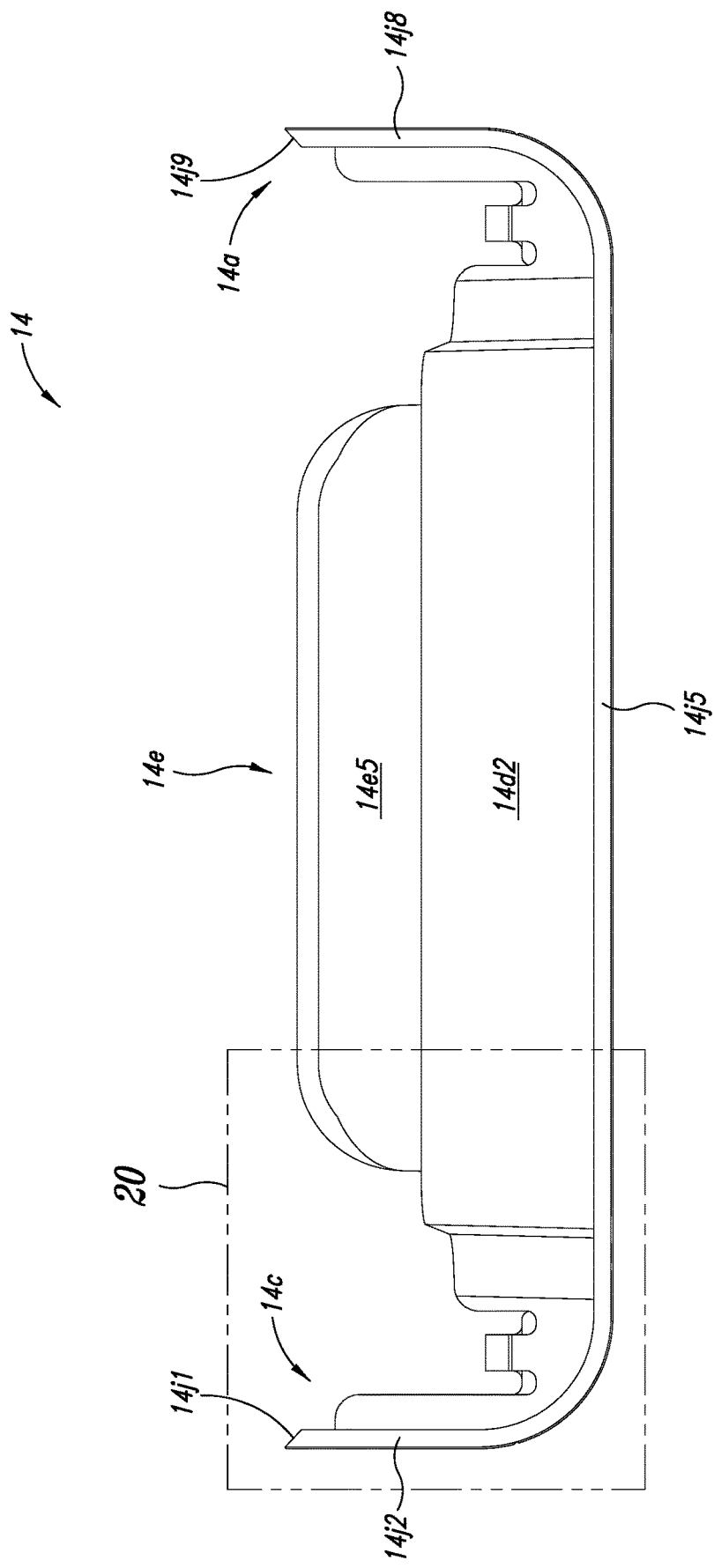
FIG. 19 is a side elevational front view of the docking adapter of FIG. 1.

Turning to FIG. 19, depicted therein is a side-elevational front view of docking adapter 14.

Figure 20:
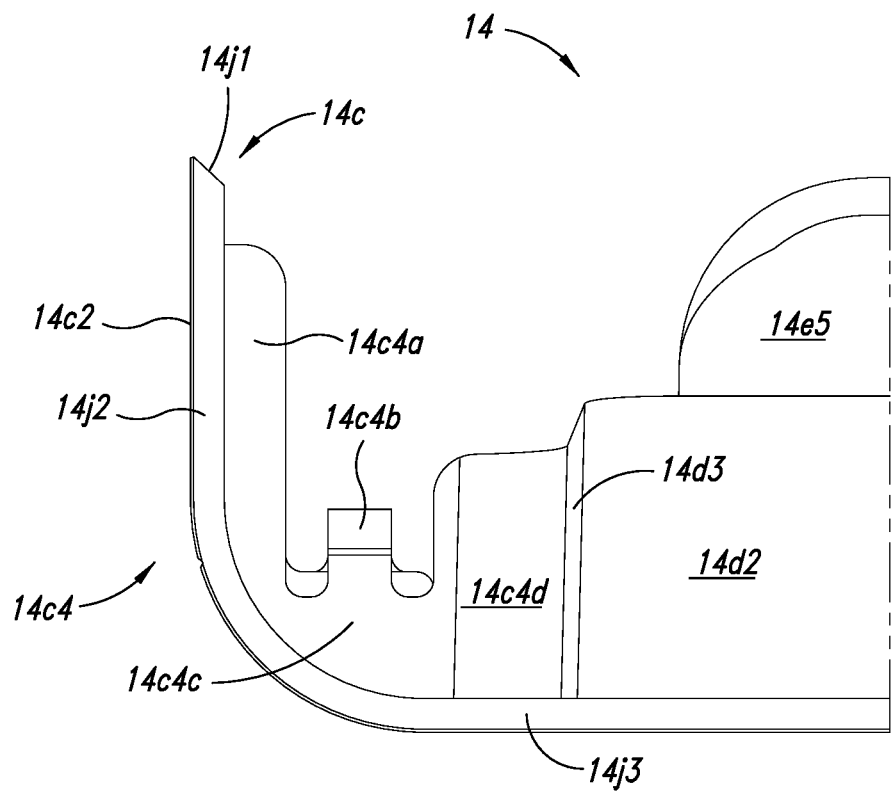
FIG. 20 is an enlarged side elevational front partial view of the docking adapter of FIG. 19.

Turning to FIG. 20, depicted therein is an enlarged side elevational front view of docking adapter 14.

Figure 21:
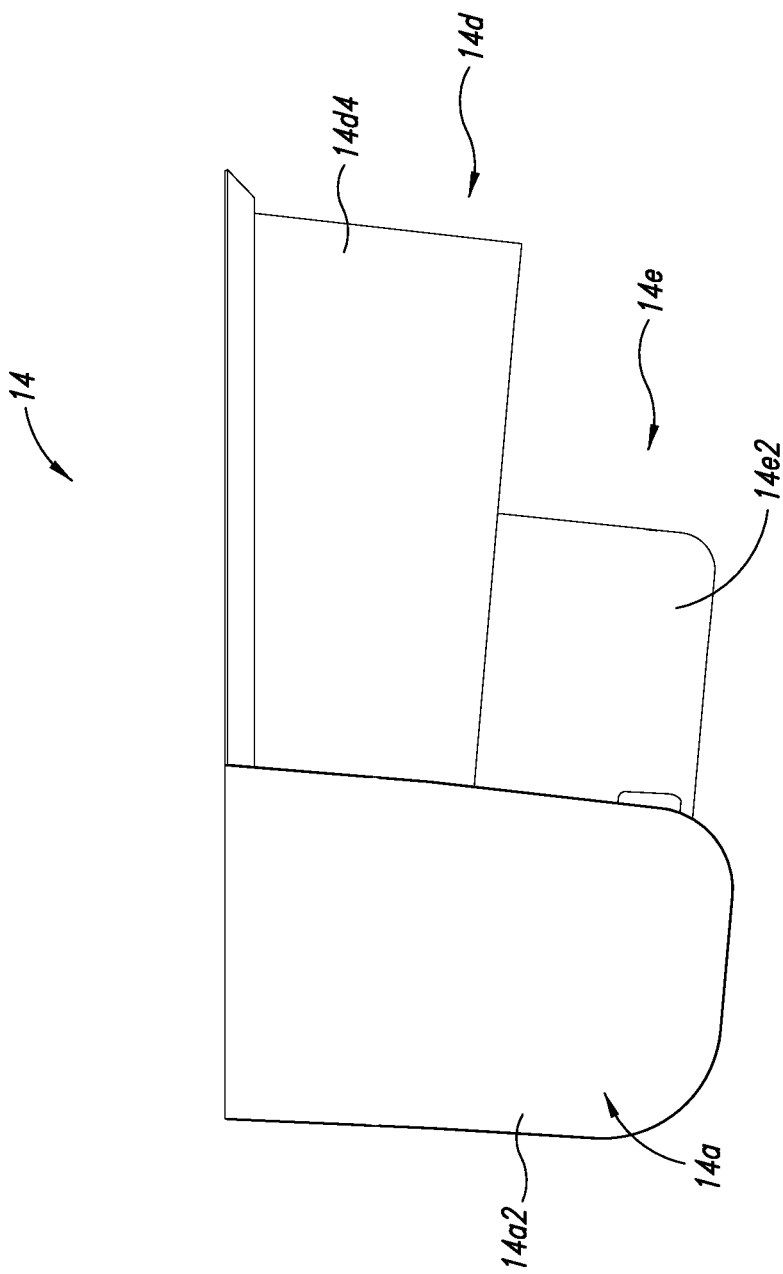
FIG. 21 is a side elevational view of the docking adapter of FIG. 1.

Turning to FIG. 21, depicted therein is a side elevational view of docking adapter 14.

Figure 22:
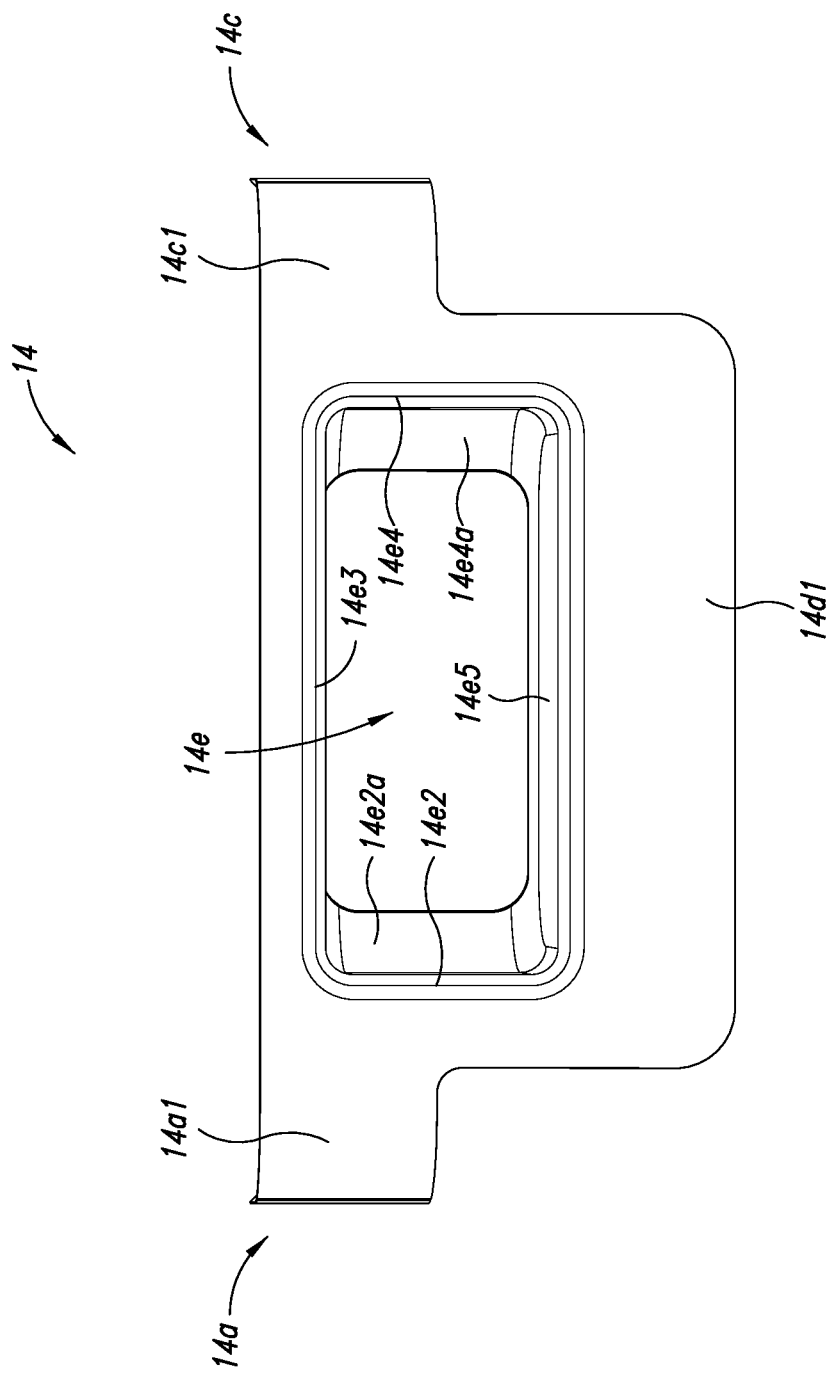
FIG. 22 is a top plan view of the docking adapter of FIG. 1.

Turning to FIG. 22, depicted therein is a top plan view of docking adapter 14.

Figure 23:
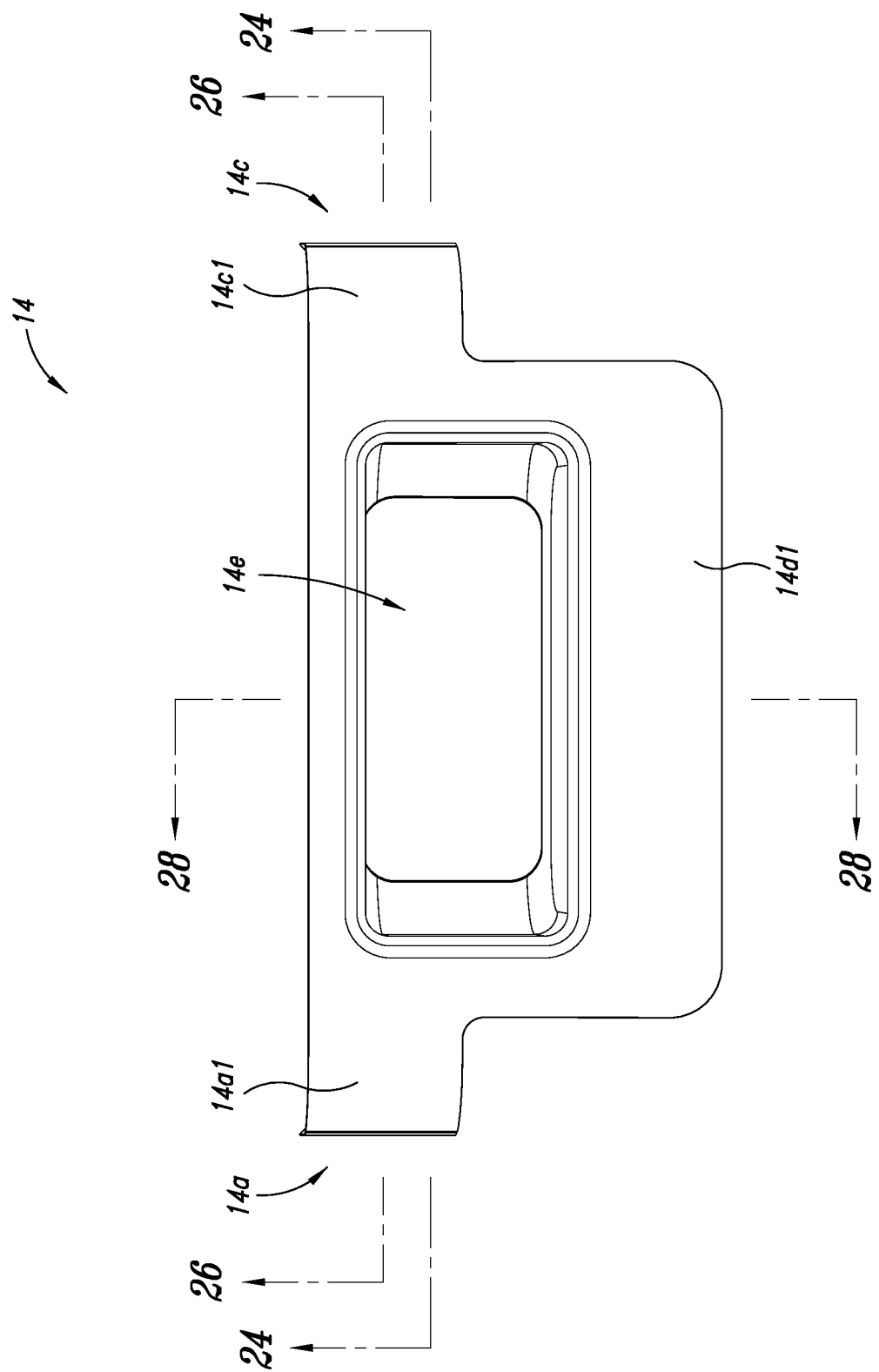
FIG. 23 is a top plan view of the docking adapter of FIG. 1.

Turning to FIG. 23, depicted therein is a top plan view of docking adapter 14.

Figure 24:
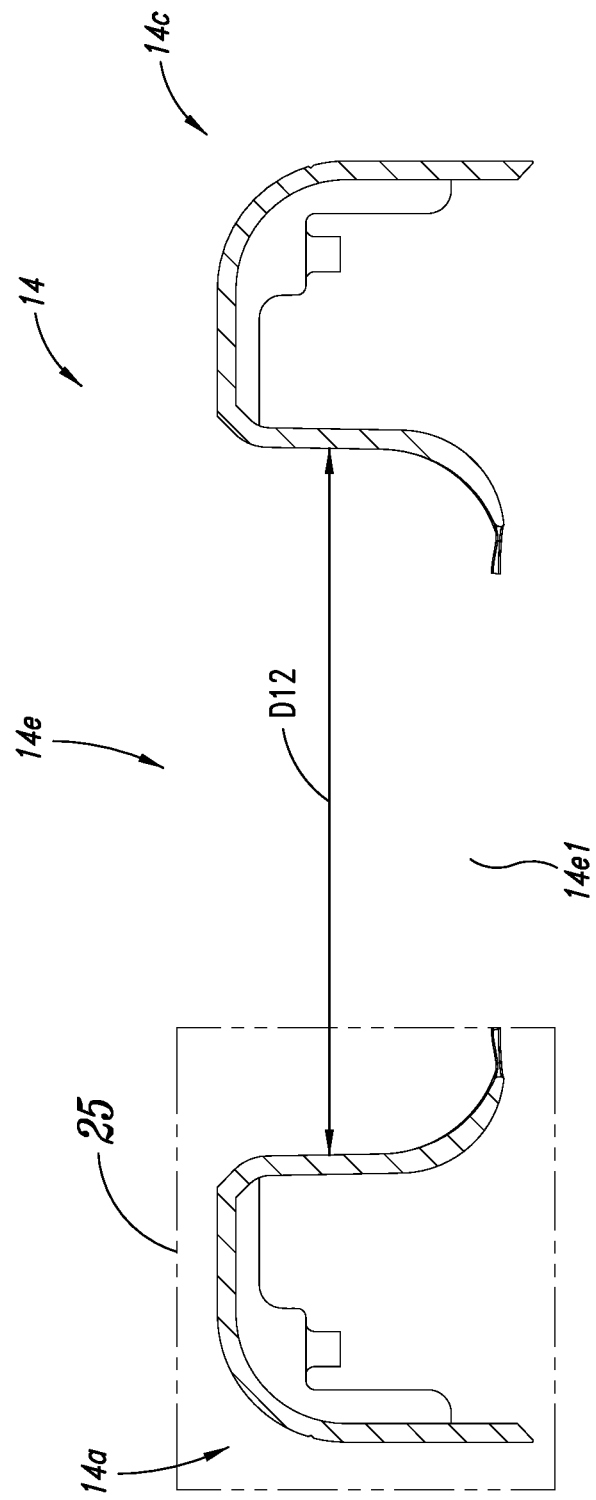
FIG. 24 is a cross sectional side elevational view of the docking adapter taken along the 24-24 cutline of FIG. 23.

Turning to FIG. 24, depicted therein is a cross sectional side elevational view of docking adapter 14 taken along the 24-24 cutline of FIG. 23. Depicted implementation of docking adapter 14 is shown to include dimension D12.

Figure 25:
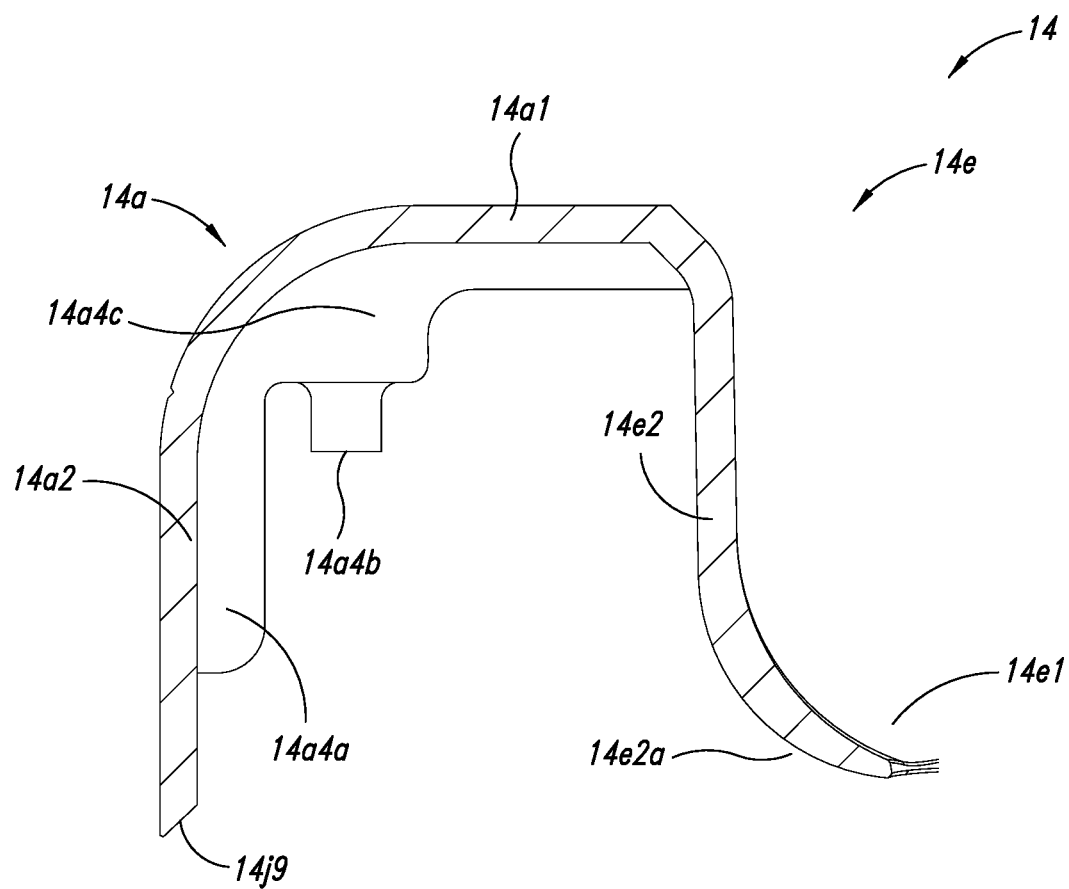
FIG. 25 is an enlarged cross sectional side elevational view of the docking adapter of FIG. 24.

Turning to FIG. 25, depicted therein is an enlarged cross sectional side-elevational view of docking adapter 14 taken along the 25-25 cutline of FIG. 23.

Figure 26:
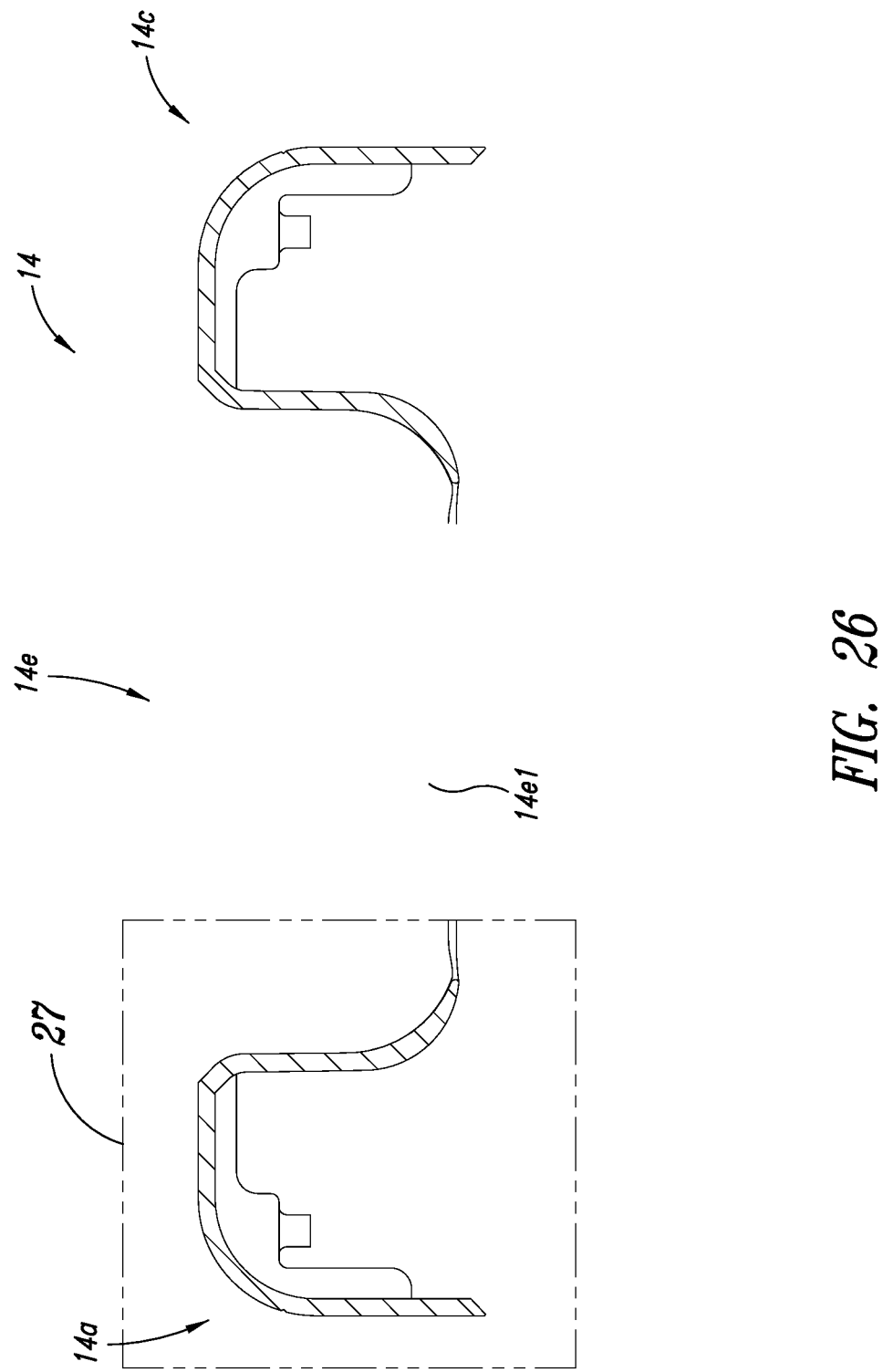
FIG. 26 is a cross sectional side elevational view of the docking adapter taken along the 26-26 cutline of FIG. 23.

Turning to FIG. 26, depicted therein is a cross sectional side-elevational view of docking adapter 14.

Figure 27:
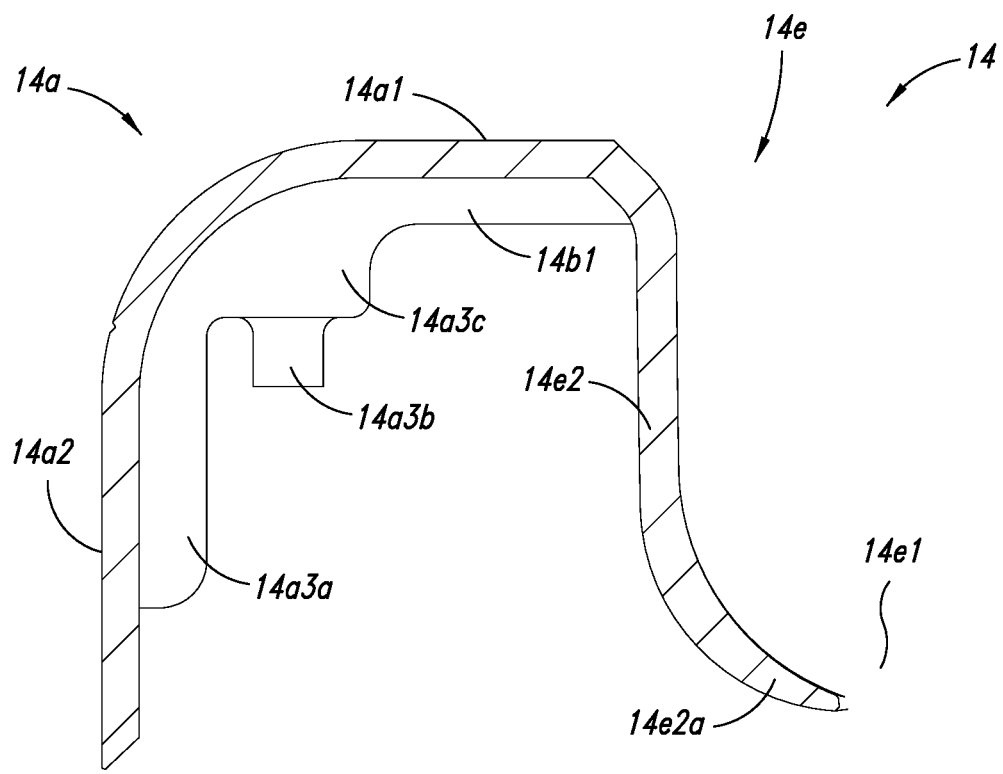
FIG. 27 is an enlarged cross sectional side elevational partial view of the docking adapter of FIG. 26.

Turning to FIG. 27, depicted therein is an enlarged cross sectional side view of docking adapter 14.

Figure 28:
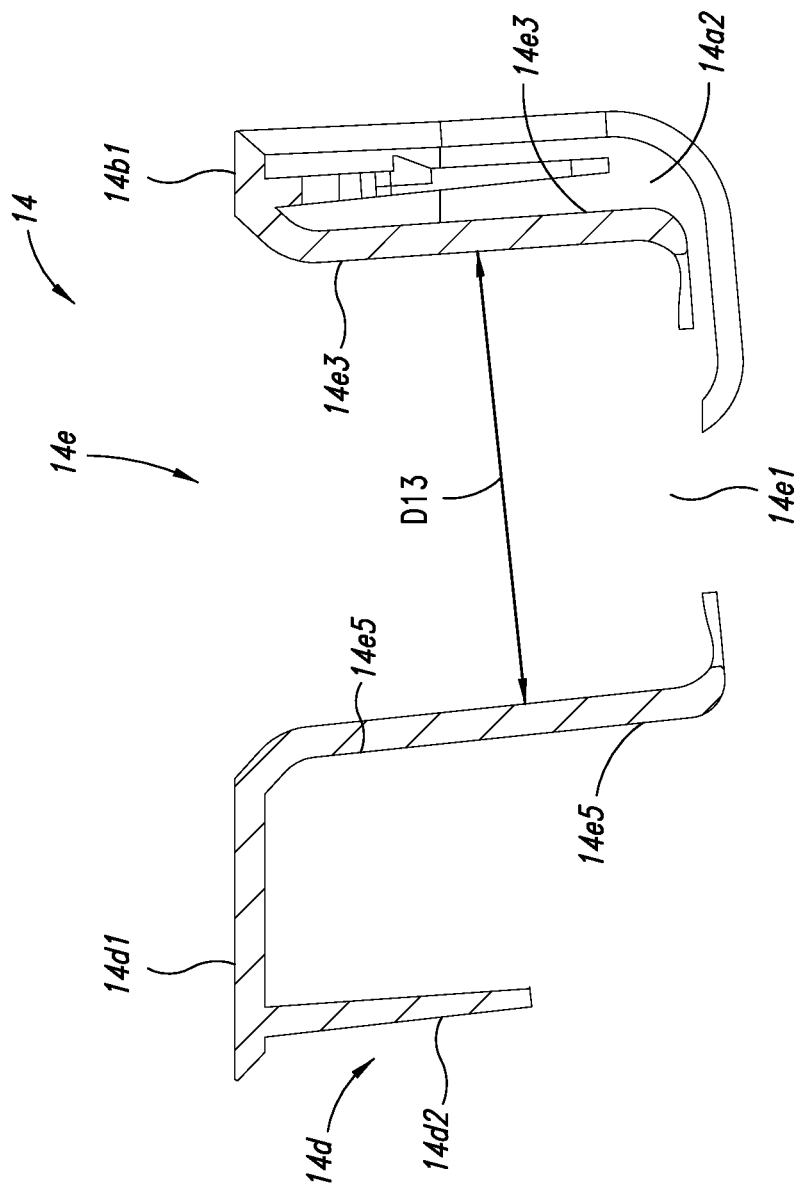
FIG. 28 is a cross sectional side elevational view of the docking adapter taken along the 28-28 cutline of FIG. 23.

Turning to FIG. 28, depicted therein is a cross sectional side elevational view of docking adapter 14 taken along the 28-28 cutline of FIG. 23. Depicted implementation of docking adapter 14 is shown to include dimension D13.

Figure 29:
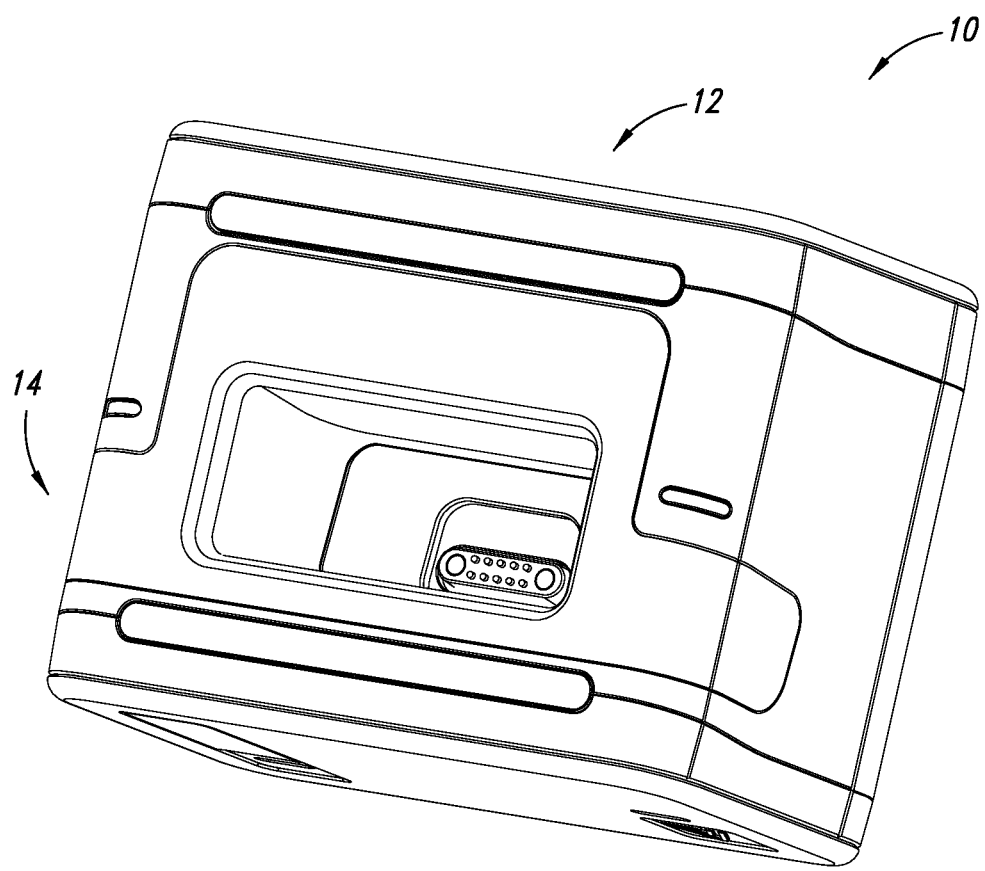
FIG. 29 is a top front perspective view of the charger assembly coupled with the docking adapter of FIG. 1.

Turning to FIG. 29, depicted therein is a top front perspective view of charger assembly 12 coupled with docking adapter 14.

Figure 30:
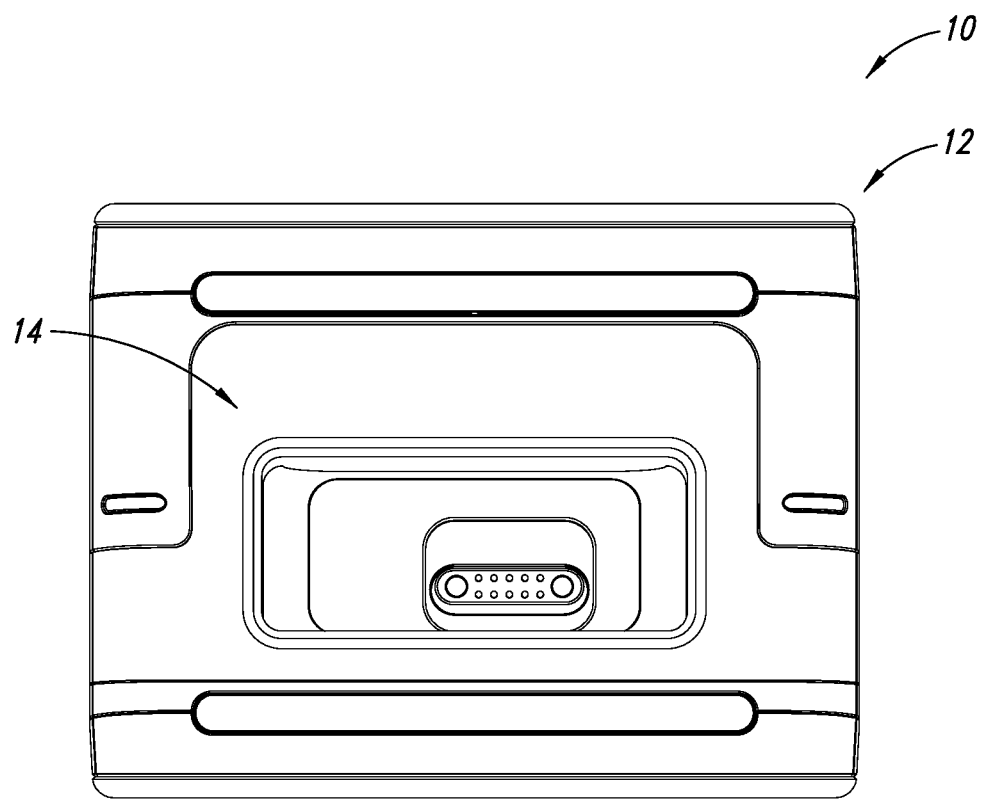
FIG. 30 is a top plan view of the charger assembly coupled with the docking adapter of FIG. 1.

Turning to FIG. 30, depicted therein is a top plan view of charger assembly 12 coupled with docking adapter 14.

Figure 31:
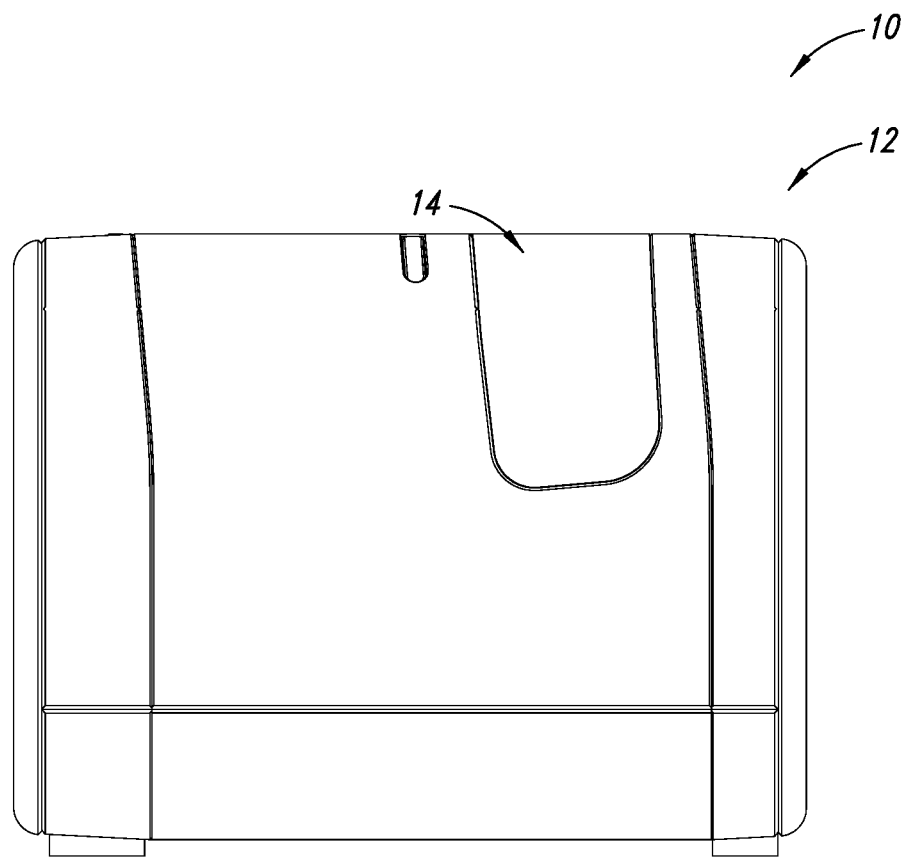
FIG. 31 is a side elevational view of the charger assembly coupled with the docking adapter of FIG. 1.

Turning to FIG. 31, depicted therein is a side elevational view of charger assembly 12 coupled with docking adapter 14.

Figure 32A:
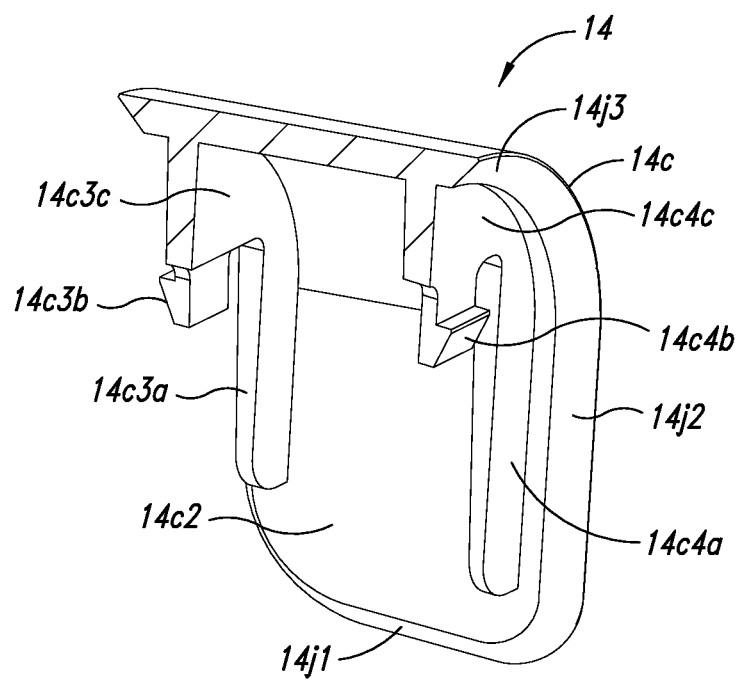
FIG. 32A is a cross sectional perspective partial view of the docking adapter of FIG. 1.

Turning to FIG. 32A, depicted therein is a cross sectional perspective partial view of docking adapter 14.

Figure 32B:
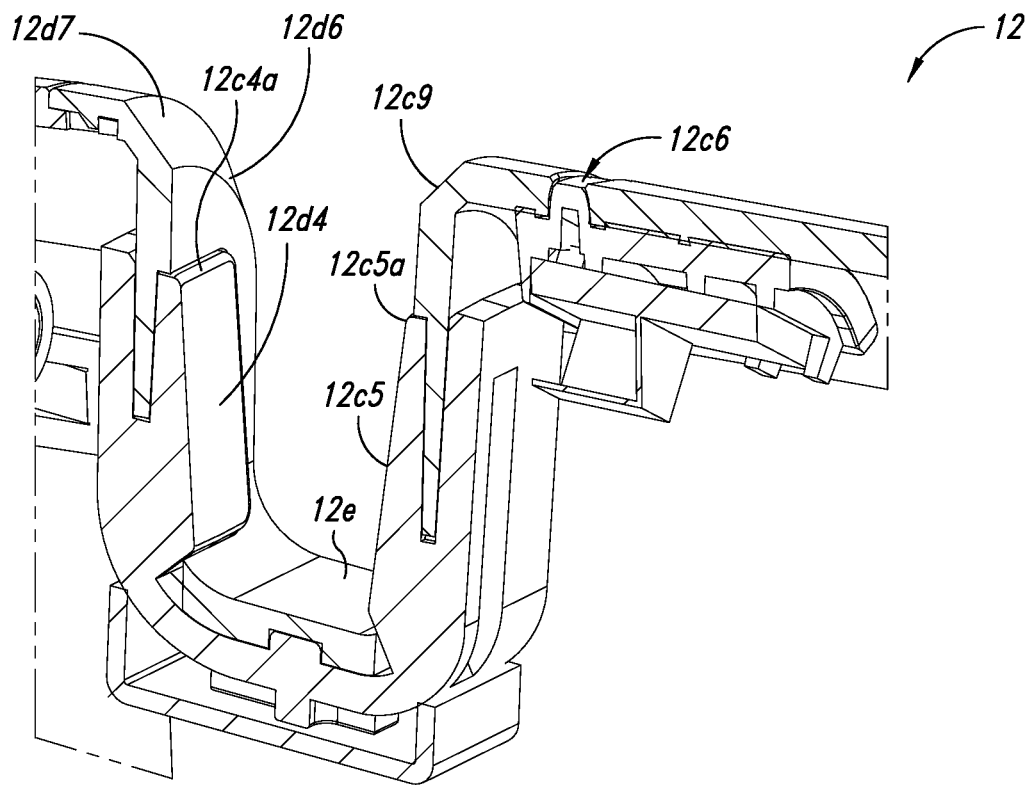
FIG. 32B is a cross sectional perspective partial view of the charger assembly of FIG. 1.

Turning to FIG. 32B, depicted therein is a cross sectional perspective partial view of charger assembly 12.

Figure 32C:
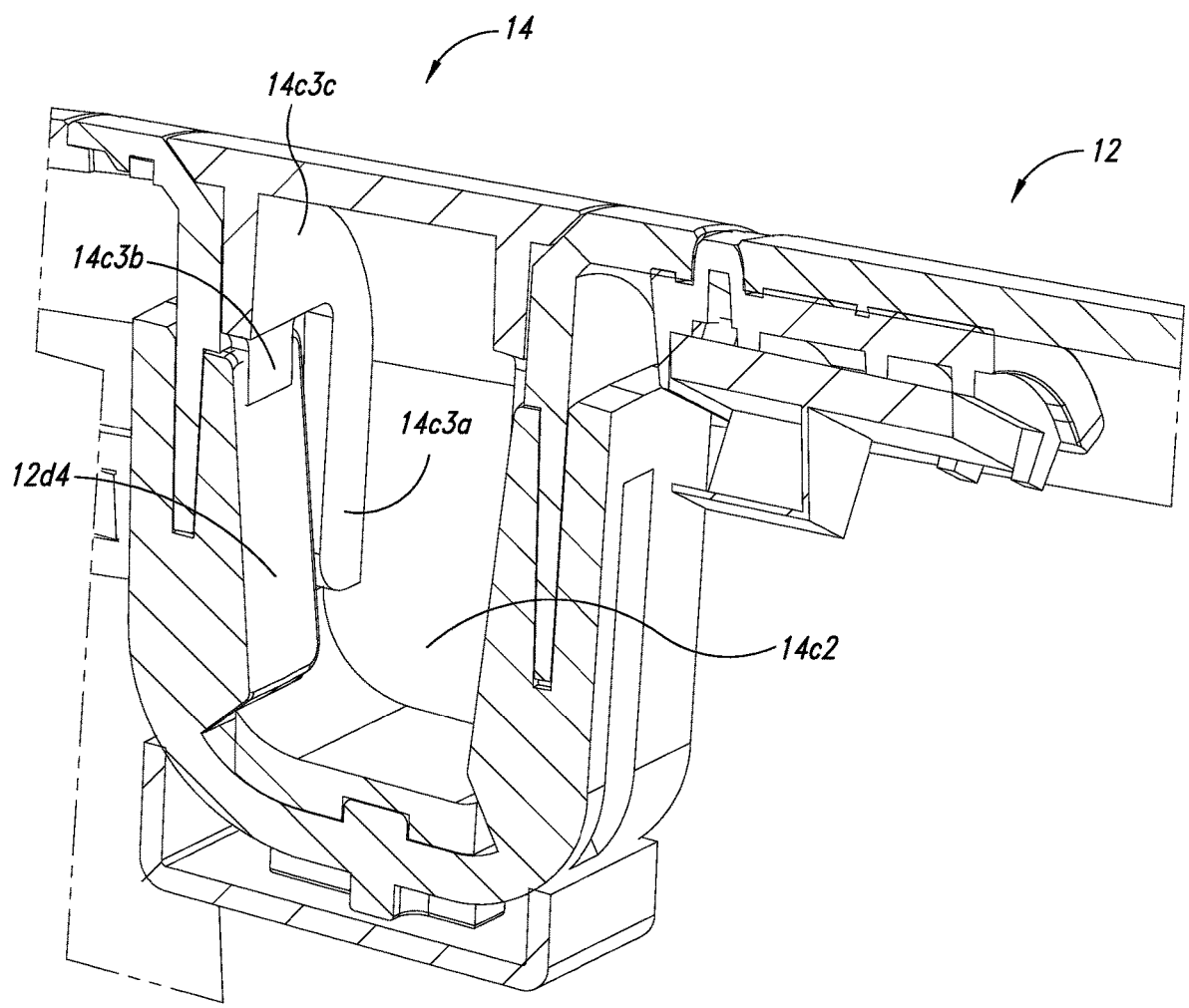
FIG. 32C is a cross sectional perspective partial view of the charger assembly coupled with the docking adapter of FIG. 1.

Turning to FIG. 32C, depicted therein is a cross sectional perspective partial view of charger assembly 12 coupled with docking adapter 14.

Figure 33A:
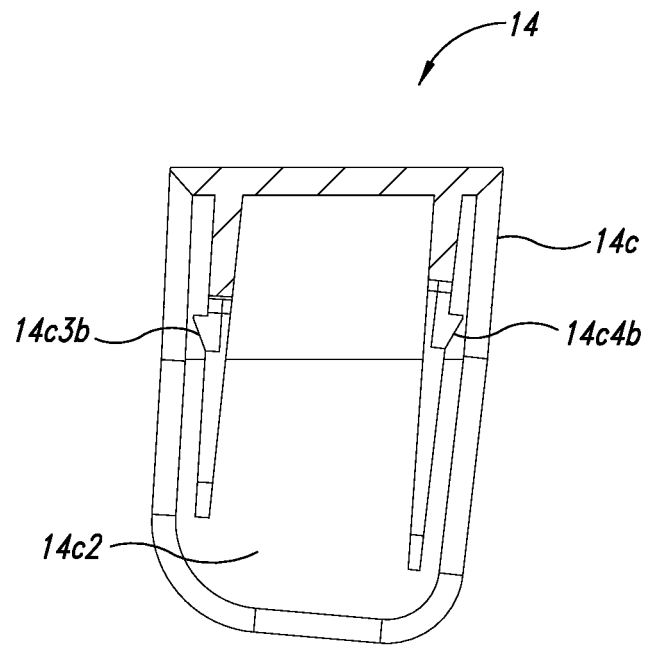
FIG. 33A is a cross sectional side elevational partial view of the docking adapter of FIG. 1.

Turning to FIG. 33A, depicted therein is a cross sectional side elevational view of docking adapter 14.

Figure 33B:
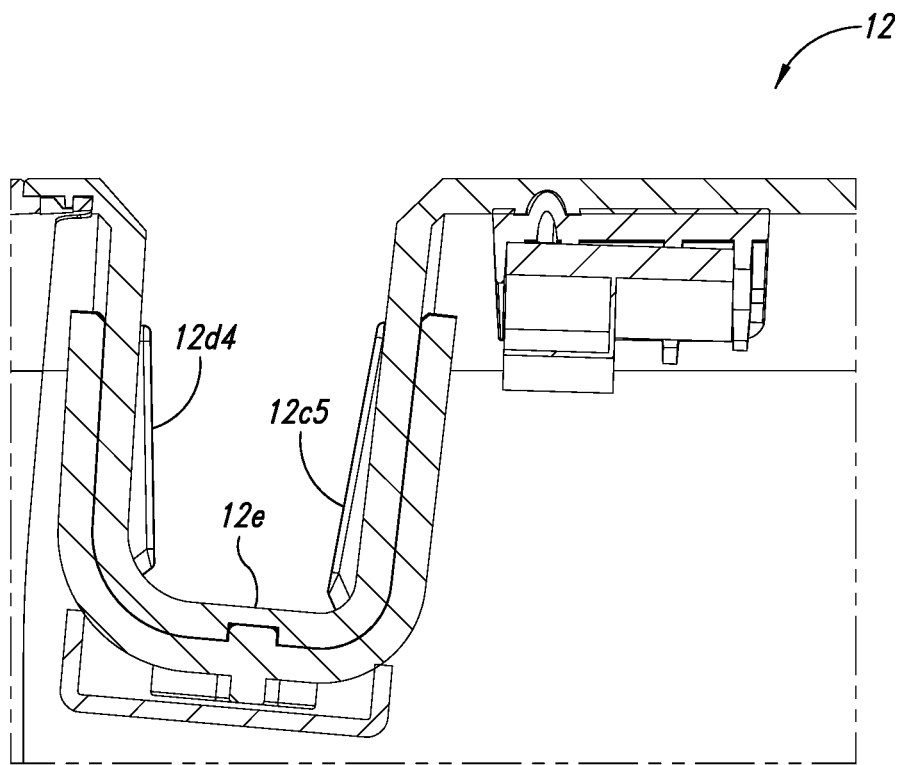
FIG. 33B is a cross sectional side elevational partial view of the charger assembly of FIG. 1.

Turning to FIG. 33B, depicted therein is a cross sectional side elevational partial view of charger assembly 12.

Figure 33C:
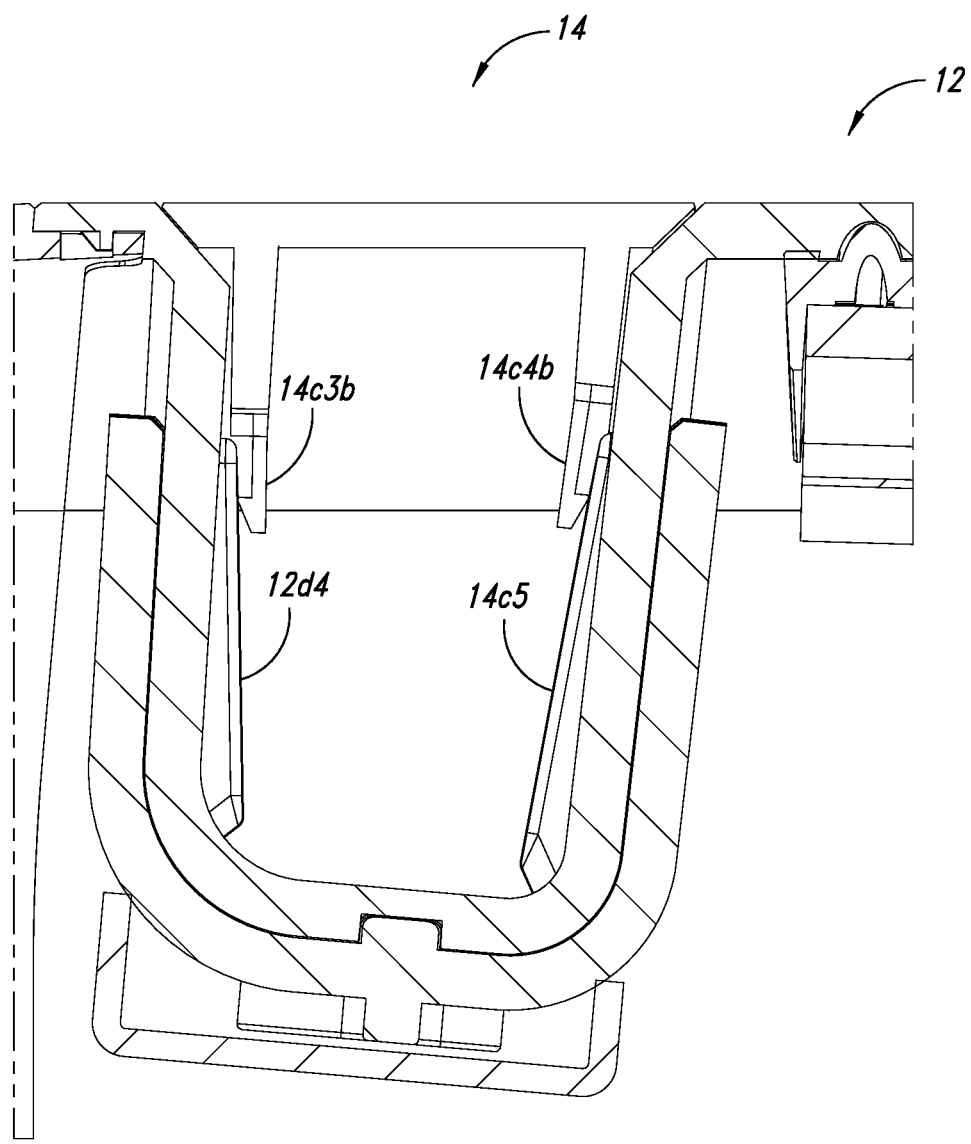
FIG. 33C is a cross sectional side elevational partial view of the charger assembly coupled with the docking adapter of FIG. 1.

Turning to FIG. 33C, depicted therein is a cross sectional side elevational partial view of charger assembly 12 coupled with docking adapter 14.

Figure 34:
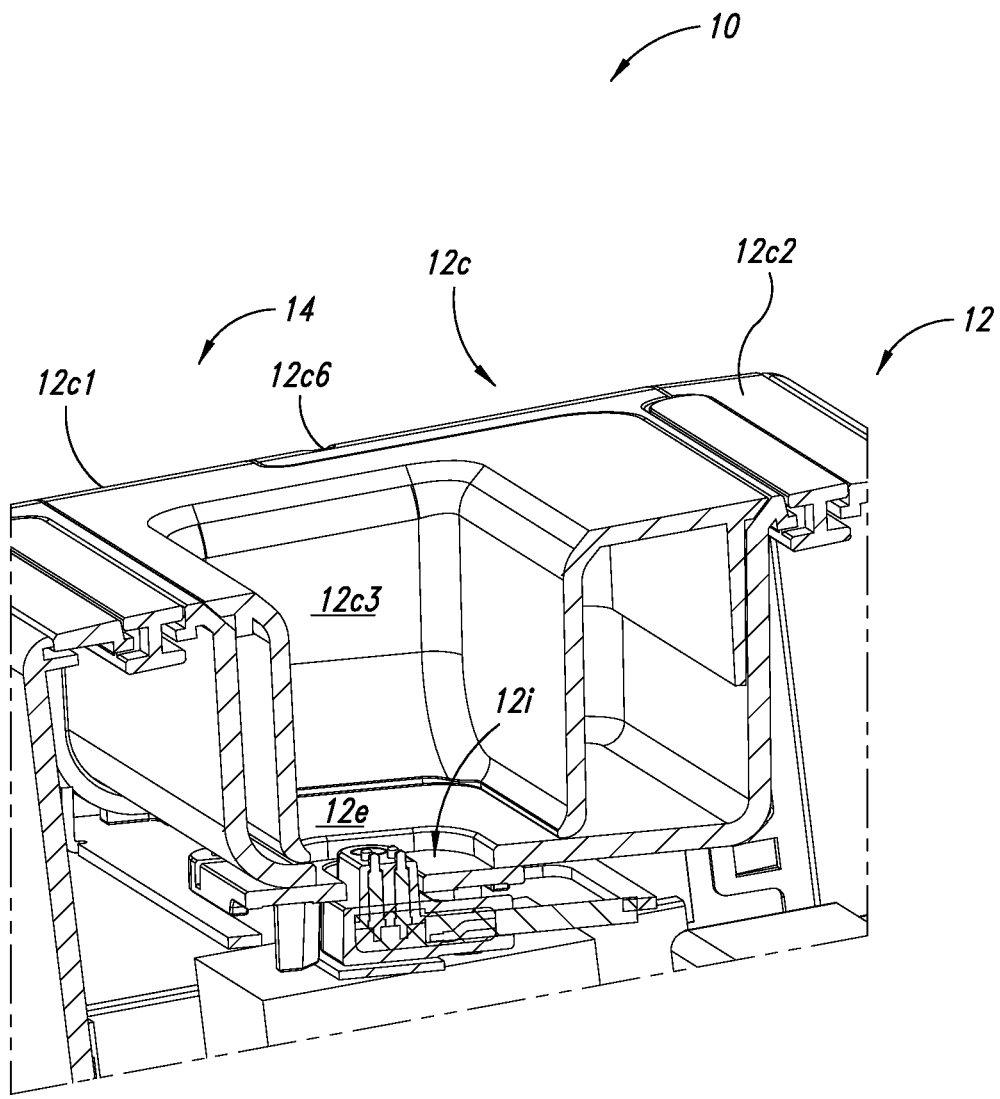
FIG. 34 is a cross sectional perspective partial view of the charger assembly coupled with the docking adapter of FIG. 1.

Turning to FIG. 34, depicted therein is a cross sectional perspective partial view of charger assembly 12 coupled with docking adapter 14.

Figure 35:
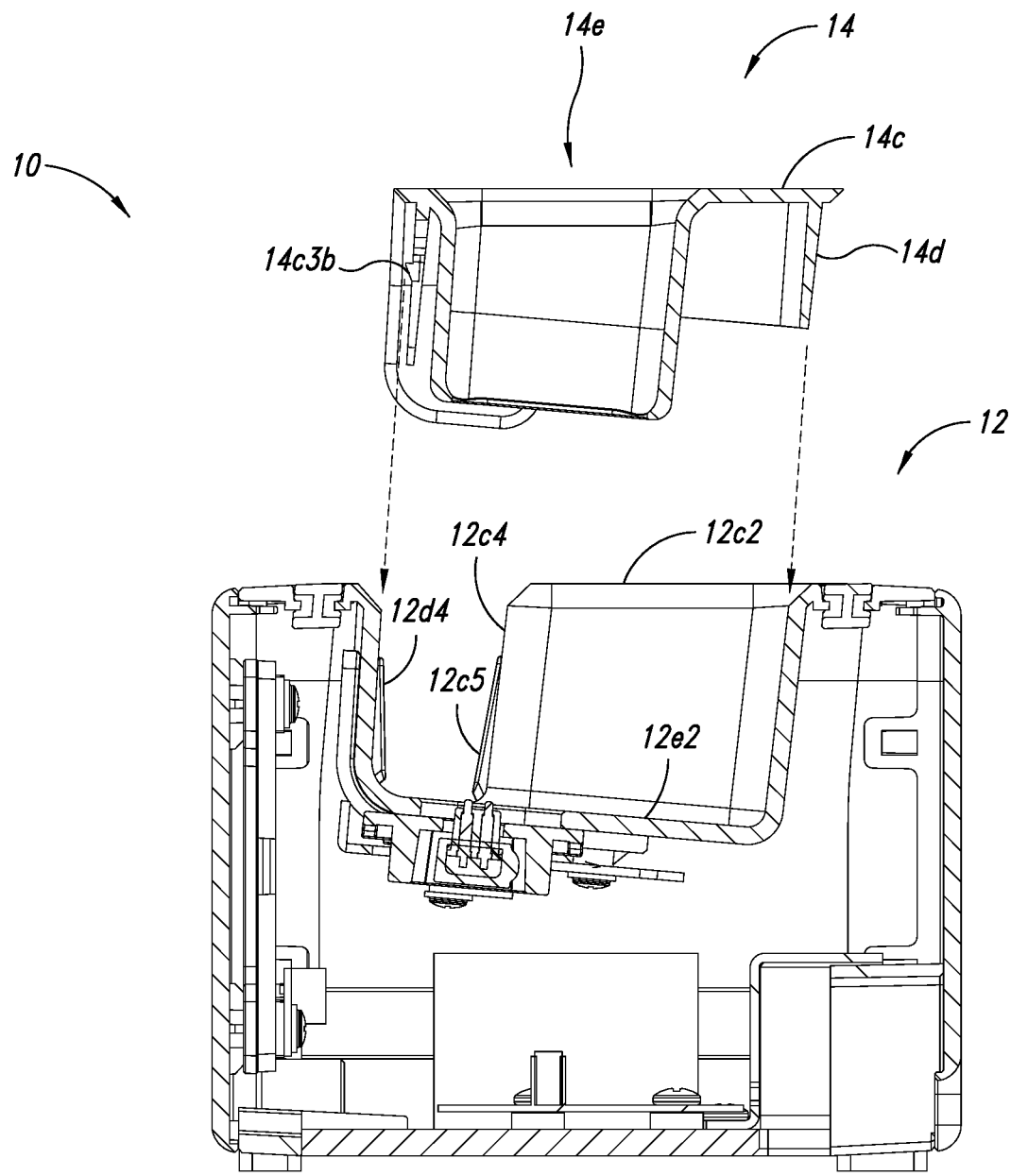
FIG. 35 is a cross sectional side elevational view of the charger assembly uncoupled from the docking adapter of FIG. 1.

Turning to FIG. 35, depicted therein is a cross sectional side elevational view of charger assembly 12 uncoupled from docking adapter 14.

Figure 35A:
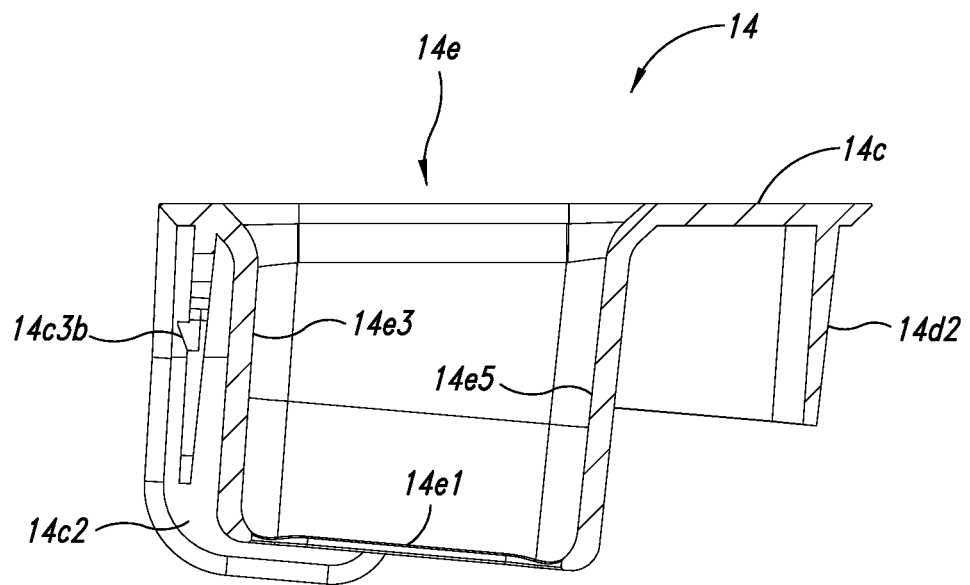
FIG. 35A is a cross sectional side elevational view of the docking adapter of FIG. 1.

Turning to FIG. 35A, depicted therein is a cross sectional side elevational view of docking adapter 14.

Figure 35B:
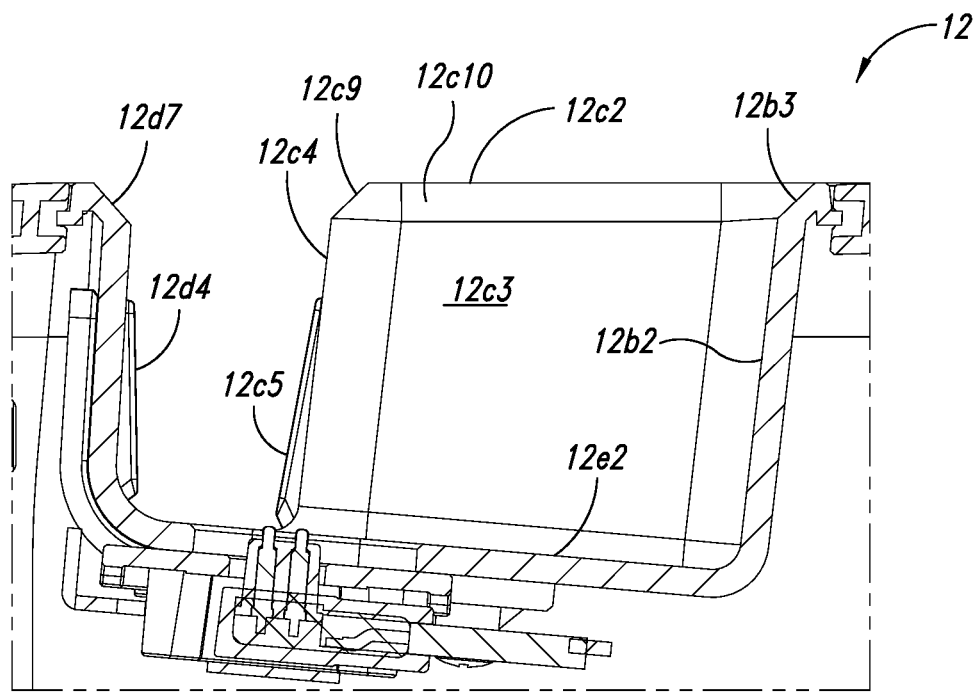
FIG. 35B is a cross sectional side elevational partial view of the charger assembly of FIG. 1.

Turning to FIG. 35B, depicted therein is a cross sectional side elevational partial view of charger assembly 12.

Figure 35C:
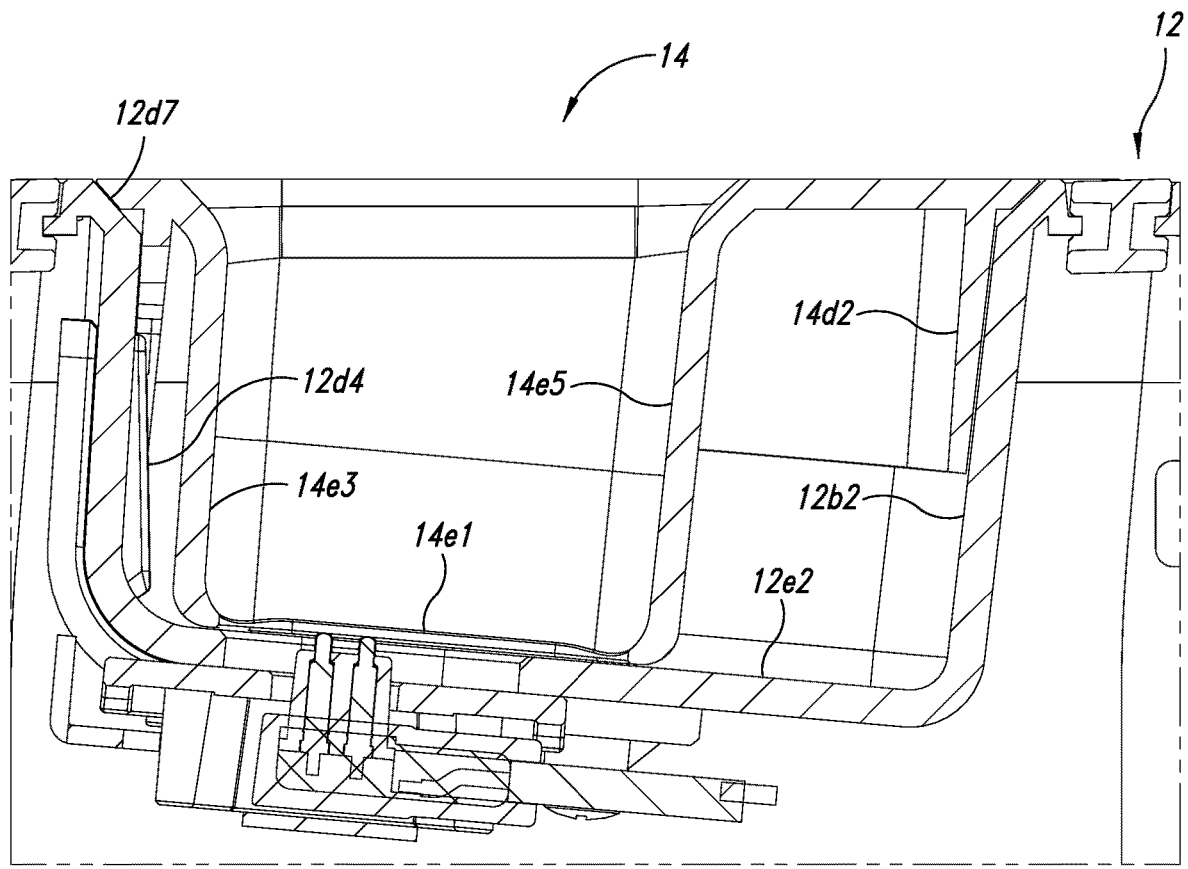
FIG. 35C is a cross sectional side elevational partial view of the charger assembly coupled with the docking adapter of FIG. 1.

Turning to FIG. 35C, depicted therein is a cross sectional side elevational partial view of charger assembly 12 coupled with docking adapter 14.

Figure 35D:
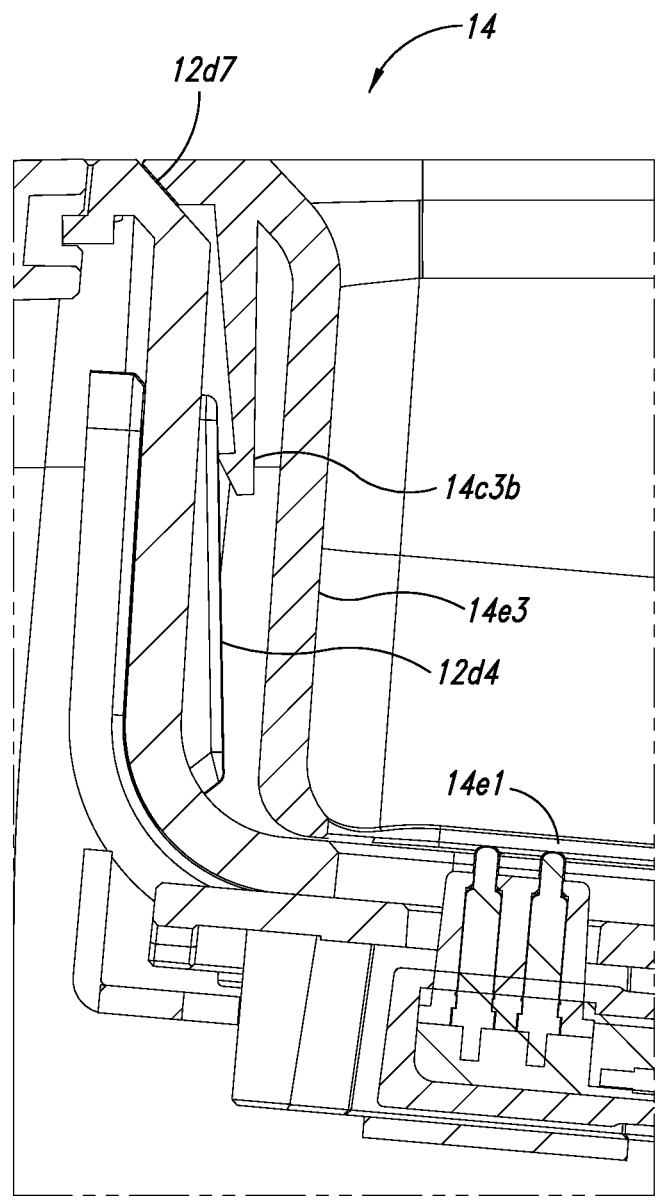
FIG. 35D is an enlarged cross sectional side elevational partial view of the charger assembly coupled with the docking adapter of FIG. 35C.

Turning to FIG. 35D, depicted therein is an enlarged cross sectional side elevational partial view of charger assembly 12 coupled with docking adapter 14.

Figure 36:
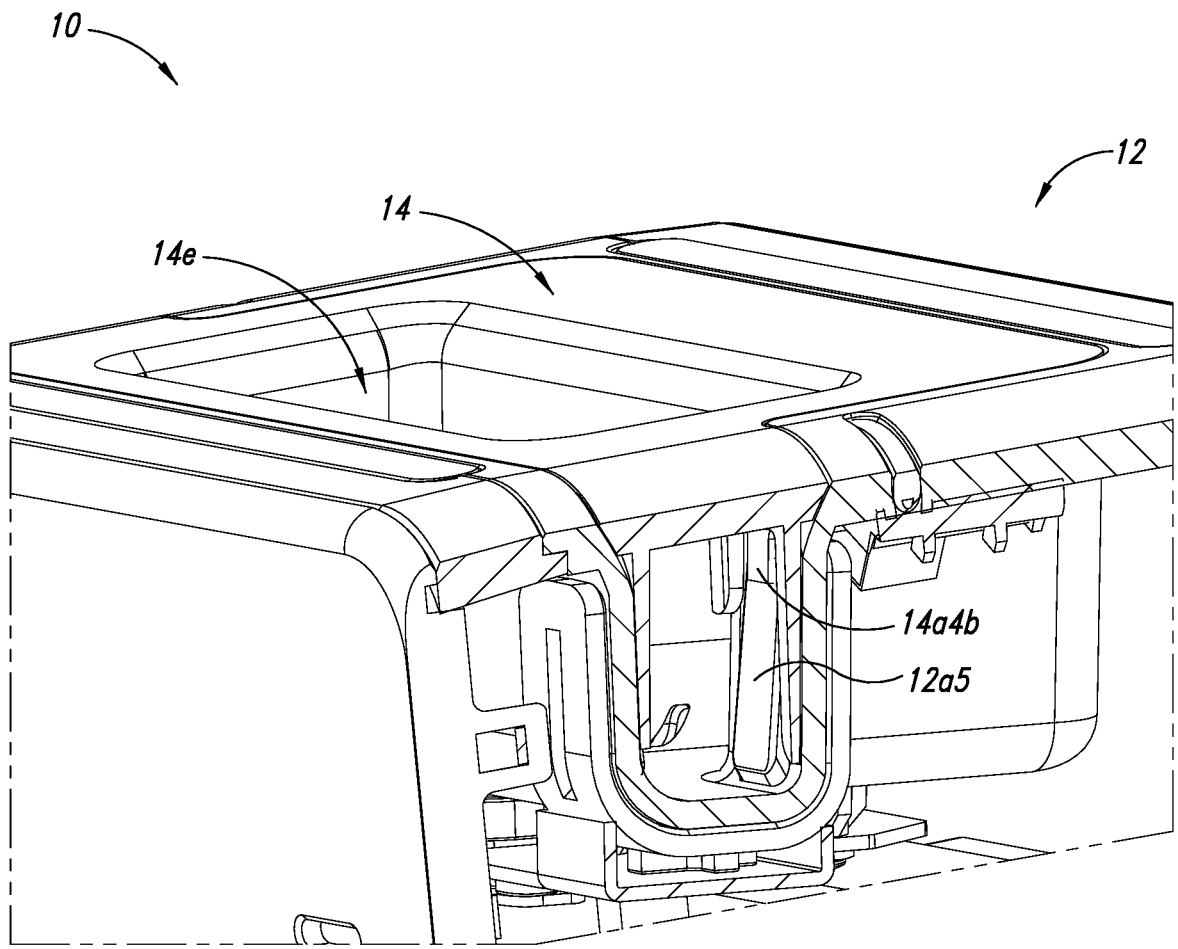
FIG. 36 is a cross sectional perspective partial view of the charger assembly coupled with the docking adapter of FIG. 1.

Turning to FIG. 36, depicted therein is a cross sectional perspective view of charger assembly 12 coupled with docking adapter 14.

Figure 37A:
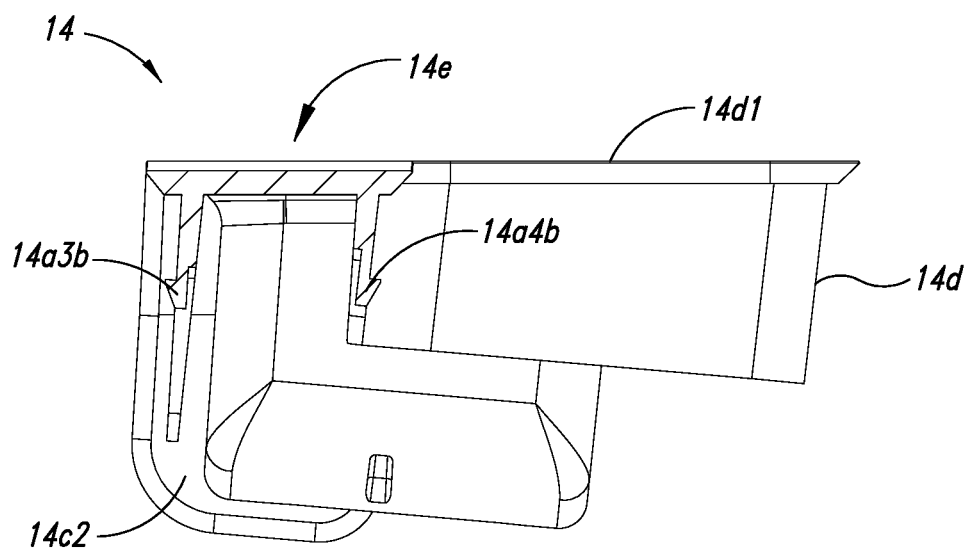
FIG. 37A is a cross sectional side elevational view of the docking adapter of FIG. 1.

Turning to FIG. 37A, depicted therein is a cross sectional side elevational view of docking adapter 14.

Figure 37B:
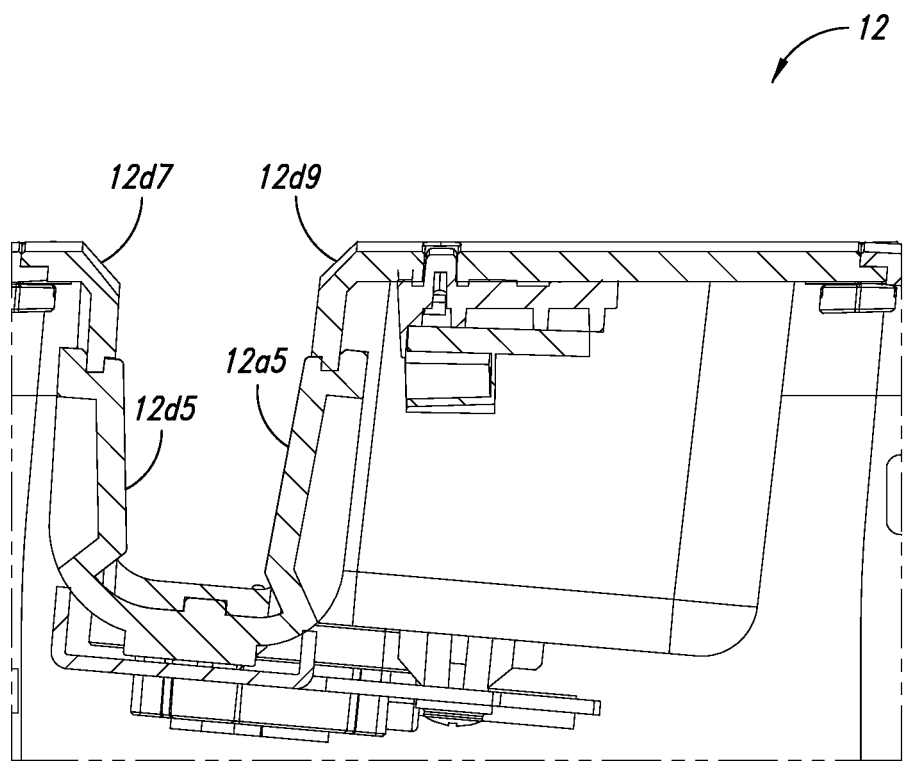
FIG. 37B is a cross sectional side elevational partial view of the charger assembly of FIG. 1.

Turning to FIG. 37B, depicted therein is a cross sectional side elevational partial view of charger assembly 12.

Figure 37C:
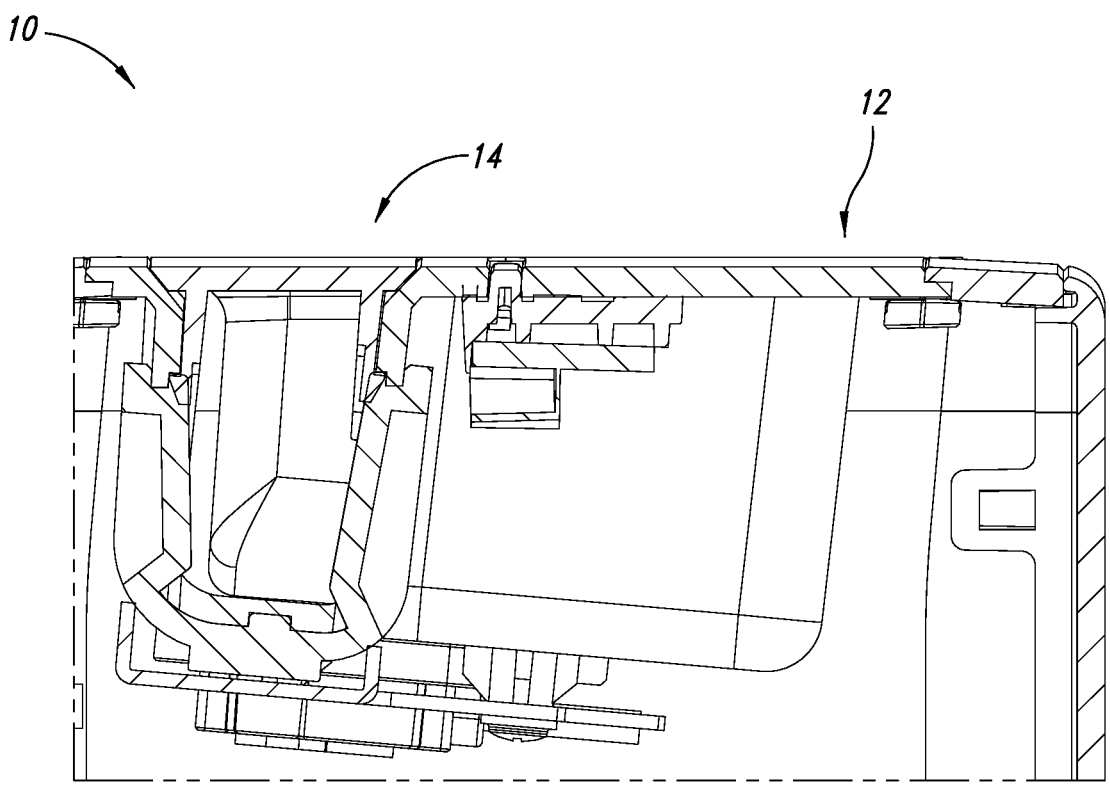
FIG. 37C is a cross sectional side elevational partial view of the charger assembly coupled with the docking adapter of FIG. 1.

Turning to FIG. 37C, depicted therein is a cross sectional side elevational partial view of charger assembly 12 coupled with docking adapter 14.

Figure 37D:
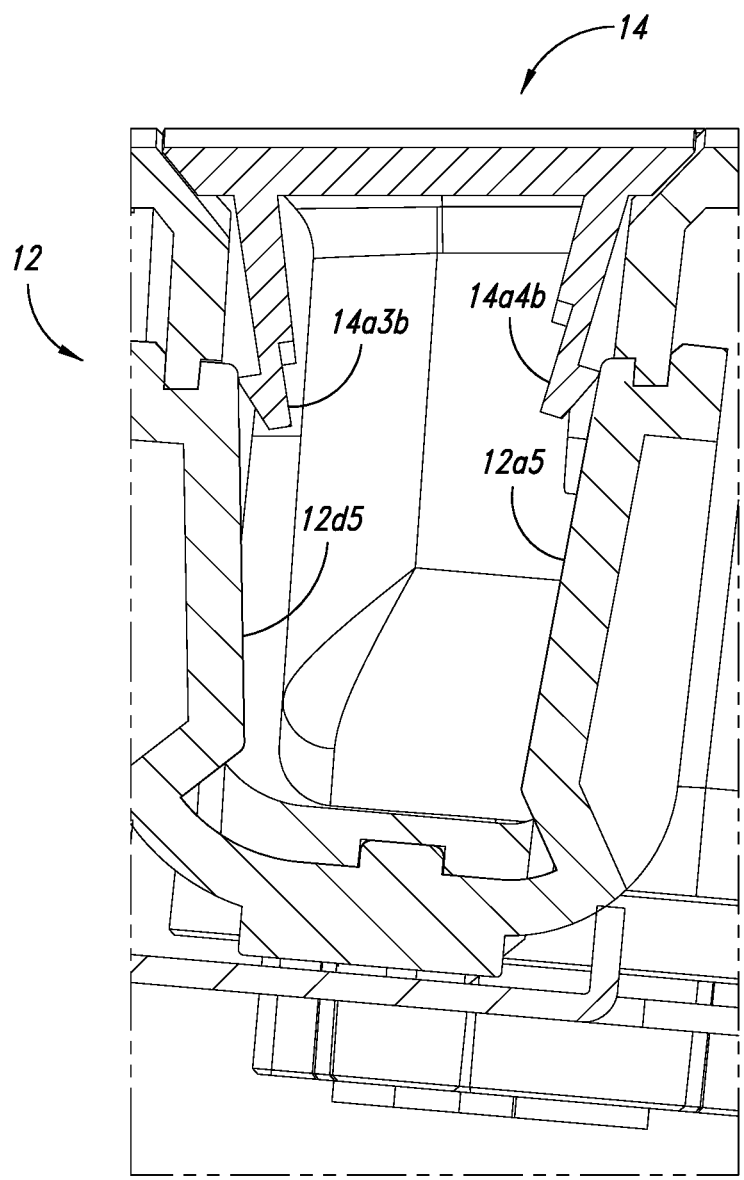
FIG. 37D is an enlarged cross sectional side elevational partial view of the coupled charger assembly and docking adapter of FIG. 37C.

Turning to FIG. 37D, depicted therein is an enlarged cross sectional side elevational partial view of charger assembly 12 coupled with docking adapter 14.

Figure 38:
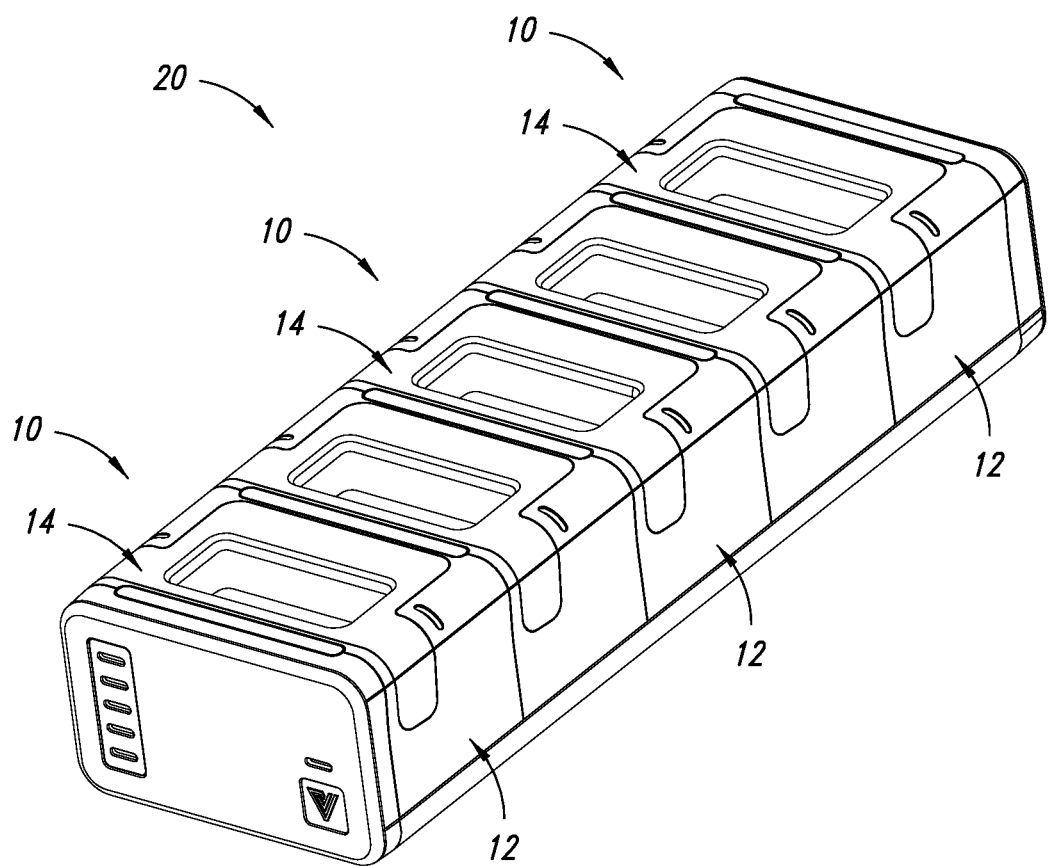
FIG. 38 is a top front perspective view of a multiple charger docking adapter system.

Turning to FIG. 38, depicted therein is a top front perspective view of multiple charger docketing adapter system 20 shown to include multiple instances of charger assembly 12 coupled with docking adapter 14.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A lone, B alone, C alone, And B together, And C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A lone, B alone, C alone, And B together, And C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "And B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A charger docking adapter system for a portable electronic device, the charger docking adapter system comprising:
    (I) a charger assembly including
        (A) an interior area; and
    (II) a docking adapter coupled with the charger assembly, the docking adapter including
        (A) a receptacle for the portable electronic device, the receptacle including an interior area,
    wherein at least a portion of the interior area of the receptacle is positioned inside the interior area of the charger assembly when the docking adapter is coupled with the charger assembly, and
    wherein the charger assembly further includes:
        (B) a base bounding in part the interior area,
        (C) a first side interior facing the interior area, the first side interior bounding in part the interior area,
        (D) a second side interior facing the interior area, the second side interior bounding in part the interior area, a first portion of the first side interior facing the second side interior, the first portion of the first side interior spaced from the second side interior a first distance, and (E) a third side interior facing the interior area, the third side interior bounding in part the interior area, a second portion of the first side interior facing the third side interior, the second portion of the first side interior spaced from the third side interior a second distance, wherein the first distance is greater than the second distance.

2. The charger docking adapter system of claim 1 wherein the docking adapter includes a front wall portion spaced from and extending along at least an exterior portion of the receptacle, and wherein at least a portion of the front wall portion is in contact with at least a portion of the second side interior of the charger assembly.

3. The charger docking adapter system of claim 1 wherein the charger assembly includes a fourth side interior facing the interior area, the fourth side interior bounding in part the interior area, and wherein the fourth side interior extends between the second side interior and the third side interior.

4. The charger docking adapter system of claim 1 wherein the charger assembly being without a side interior extending between the second side interior and the first side interior, wherein the charger assembly is without a side interior extending between the third side interior and the first side interior, and wherein the docking adapter includes a side extension coupled with the second portion of the first side interior of the charger assembly and coupled to the third side interior of the charger assembly, the side extension extending between the second portion of the first side interior and the third side interior.

5. The charger docking adapter system of claim 1 wherein the charger assembly includes an electrical interface, and wherein the receptacle of the docking adapter includes a bottom aperture to provide access to the electrical interface when the docking adapter is coupled to the charger assembly.

6. The charger docking adapter system of claim 1 wherein the charger assembly includes a first cushion pad and a second cushion pad, wherein the second portion of the first side interior of the charger assembly is coupled with the first cushion pad, wherein the third side interior of the charger assembly is coupled with the second cushion pad, wherein the second cushion pad of the third side interior faces the first cushion pad of the second portion of the first side interior, wherein the docking adapter is coupled with the first cushion pad of the charger assembly, and wherein the docking adapter is coupled with the second cushion pad of the charger assembly.

7. The charger docking adapter system of claim 6 wherein the docking adapter includes a first barb and a second barb, wherein the first barb of the docking adapter is coupled with the first cushion pad of the charger assembly, and wherein the second barb of the docking adapter is coupled with the second cushion pad of the charger assembly.

8. The charger docking adapter system of claim 1 wherein the second portion of the first side interior of the charger assembly includes a first beveled edge, wherein the docking adapter includes a first beveled edge being in contact with at least a portion of the first beveled edge of the second portion of the first side interior of the charger assembly, wherein the third side interior of the charger assembly includes a second beveled edge, and wherein the docking adapter includes a second beveled edge being in contact with at least a portion of the second beveled edge of the third side interior of the charger assembly.

9. A charger docking adapter system for a portable electronic device, the charger docking adapter system comprising:

(I) a charger assembly including
 (A) an interior area including
  a first border,
  a second border opposite a mid-portion of the first border,
  a third border opposite a first end portion of the first border,
  a fourth border opposite a second end portion of the first border,
  a fifth border extending perpendicular with respect to the second border and the third border between the second border and the third border,
  a sixth border extending perpendicular with respect to the second border and the fourth border between the second border and the fourth border,
  a seventh border extending between the third border and the first end portion of the first border,
  an eighth border extending between the fourth border and the second end portion of the first border,
 (B) a first side interior bounding the first border of the interior area,
 (C) a second side interior bounding the second border of the interior area,
 (D) a third side interior bounding the third border of the interior area,
 (E) a fourth side interior bounding the fourth border of the interior area,
 (F) a fifth side interior bounding the fifth border of the interior area,
 (G) a sixth side interior bounding the sixth border of the interior area,
 wherein the seventh border of the interior area is unbonded by any side interior of the charger assembly, and
 wherein the eighth border of the interior area is unbonded by any side interior of the charger assembly; and (II) a docking adapter coupled with the charger assembly, the docking adapter including
 (A) a receptacle for the portable electronic device, the receptacle including an interior area,
 wherein at least a portion of the interior area of the receptacle is positioned inside the interior area of the charger assembly when the docking adapter is coupled with the charger assembly.

10. The charger docketing adapter system of claim 9 wherein the docking adapter includes a front wall portion spaced from and extending along at least an exterior portion of the receptacle, and wherein at least a portion of the front wall portion is in contact with at least a portion of the second side interior of the charger assembly.

11. The charger docketing adapter system of claim 9
wherein the charger assembly includes an electrical interface, and
wherein the receptacle of the docking adapter includes a bottom aperture to provide access to the electrical interface when the docking adapter is coupled to the charger assembly.

12. The charger docketing adapter system of claim 9
wherein the charger assembly includes a first cushion pad and a second cushion pad facing the first cushion pad,
wherein the first end portion of the first side interior of the charger assembly is coupled with the first cushion pad,
wherein the third side interior of the charger assembly is coupled with the second cushion pad,
wherein the docking adapter is coupled with the first cushion pad of the charger assembly, and
wherein the docking adapter is coupled with the second cushion pad of the charger assembly.

13. The charger docketing adapter system of claim 12
wherein the docking adapter includes a first barb and a second barb,
wherein the first barb of the docking adapter is coupled with the first cushion pad of the charger assembly, and
wherein the second barb of the docking adapter is coupled with the second cushion pad of the charger assembly.

14. The charger docketing adapter system of claim 9
wherein the first side interior of the charger assembly includes a first beveled edge,
wherein the docking adapter includes a first beveled edge being in contact with at least a portion of the first beveled edge of the first side interior of the charger assembly,
wherein the third side interior of the charger assembly includes a second beveled edge, and
wherein the docking adapter includes a second beveled edge being in contact with at least a portion of the second beveled edge of the third side interior of the charger assembly.

15. A charger docking adapter system for a portable electronic device, the charger docking adapter system comprising:
(I) a charger assembly with an interior area, the charger assembly including
(A) a first side bounding in part the interior area,
(B) a second side bounding in part the interior area having a first end and a second end, the second side being positioned opposite of the first side,
(C) a third side bounding in part the interior area, the third side perpendicularly extending between the first end of the second side and an end of the third side,
(D) a fourth side bounding in part the interior area, the fourth side perpendicularly extending between the second end of the second side and an end of the fourth side,
(E) a first channel into the interior area including a width extending between the first side and the end of the third side, and
(F) a second channel into the interior area including a width extending between the first side and the end of the fourth side; and
(II) a docking adapter coupled with the charger assembly, the docking adapter including
(A) a receptacle with an interior area,
wherein at least a portion of the receptacle is positioned inside the interior area of the charger assembly when the docking adapter is coupled with the charger assembly.

16. The charger docketing adapter system of claim 15
wherein the charger assembly includes a first cushion pad and a second cushion pad facing the first cushion pad,
wherein the first side interior of the charger assembly is coupled with the first cushion pad,
wherein the third side interior of the charger assembly is coupled with the second cushion pad,
wherein the docking adapter includes a first barb coupled with the first cushion pad of the charger assembly, and
wherein the docking adapter includes a second barb coupled with the second cushion pad of the charger assembly.

17. The charger docketing adapter system of claim 15
wherein the first side interior of the charger assembly includes a first beveled edge,
wherein the docking adapter includes a first beveled edge being in contact with at least a portion of the first beveled edge of the first side interior of the charger assembly,
wherein the third side interior of the charger assembly includes a second beveled edge, and
wherein the docking adapter includes a second beveled edge being in contact with at least a portion of the second beveled edge of the third side interior of the charger assembly.

* * * * *